(12) United States Patent
Walsh

(10) Patent No.: US 10,562,675 B2
(45) Date of Patent: Feb. 18, 2020

(54) METHOD AND SYSTEM FOR FORMING PACKAGES

(71) Applicant: Graphic Packaging International, Inc., Atlanta, GA (US)

(72) Inventor: Joseph C. Walsh, Boulder, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 573 days.

(21) Appl. No.: 15/142,103

(22) Filed: Apr. 29, 2016

(65) Prior Publication Data

US 2016/0318274 A1 Nov. 3, 2016

Related U.S. Application Data

(60) Provisional application No. 62/179,172, filed on Apr. 29, 2015.

(51) Int. Cl.
*B31B 37/00* (2006.01)
*B31B 41/00* (2006.01)
*B65D 33/02* (2006.01)

(52) U.S. Cl.
CPC .................................. *B65D 33/02* (2013.01)

(58) Field of Classification Search
CPC ....... B65D 33/02; B31B 70/00; B31B 70/262; B31B 2155/00; B31B 70/008;
(Continued)

(56) References Cited

U.S. PATENT DOCUMENTS

| 1,474,088 A | 11/1923 | Reynolds |
| 1,516,090 A | 11/1924 | Gary et al. |

(Continued)

FOREIGN PATENT DOCUMENTS

| CA | 2 384 311 | 3/2001 |
| CA | 2 586 472 | 5/2006 |

(Continued)

OTHER PUBLICATIONS

International Search Report and Written Opinion for PCT/US2016/042010 dated Oct. 12, 2016.
(Continued)

*Primary Examiner* — Nathaniel C Chukwurah
*Assistant Examiner* — Lucas E. A. Palmer
(74) *Attorney, Agent, or Firm* — Womble Bond Dickinson (US) LLP

(57) ABSTRACT

A method of forming reinforced packages. The method can comprise forming an attached web by adhering a blank to a web of material and moving the attached web in a downstream direction through at least a tube forming assembly and a carton forming assembly. The method also can comprise at least partially forming a tube by folding at least a portion of the web of material as the attached web moves through the tube forming assembly, forming a reinforcement sleeve by folding at least a portion of the blank so that the reinforcement sleeve extends at least partially around the tube as the attached web moves through the carton forming assembly, and forming a reinforced package comprising the reinforcement sleeve and a tube portion by separating the tube portion from a remainder of the tube, the reinforcement sleeve being adhered to the tube portion.

20 Claims, 21 Drawing Sheets

(58) Field of Classification Search
CPC ................ B31B 2160/20; B31B 70/81; B31B 2155/0012; B31B 2155/001; B31B 2160/10
See application file for complete search history.

(56) References Cited

U.S. PATENT DOCUMENTS

| | | | |
|---|---|---|---|
| 1,664,111 A | 3/1928 | Johnson | |
| 2,092,858 A | 9/1937 | Richard | |
| 2,095,910 A | 10/1937 | Bergstein | |
| 2,099,257 A * | 11/1937 | Bergstein | B65D 5/4204 229/117.32 |
| 2,107,946 A | 2/1938 | Inman | |
| 2,114,625 A | 4/1938 | Bergstein | |
| 2,134,057 A | 10/1938 | Potdevin | |
| 2,132,966 A | 11/1938 | O'Brien | |
| 2,166,388 A | 7/1939 | Bergstein | |
| 2,197,113 A | 4/1940 | Piazze | |
| 2,250,249 A | 7/1941 | Bergstein | |
| 2,273,470 A | 2/1942 | Gardner | |
| 2,282,207 A | 5/1942 | Palmer | |
| 2,286,465 A | 6/1942 | Erlin | |
| RE23,096 E | 4/1949 | Mullinix | |
| 2,502,117 A * | 3/1950 | Anderson | B31B 50/00 156/250 |
| 2,553,923 A | 5/1951 | Lambert | |
| 2,758,520 A | 8/1956 | Hepworth | |
| 2,799,211 A * | 7/1957 | Zerlin | B31B 50/00 493/129 |
| 2,835,435 A | 5/1958 | Mullinix | |
| 2,870,023 A | 1/1959 | Vogt | |
| 2,913,161 A | 11/1959 | Travis | |
| 2,987,402 A | 6/1961 | Dold | |
| 3,104,596 A * | 9/1963 | Bergstein | B29D 23/001 493/288 |
| 3,105,417 A * | 10/1963 | Hammer | B31B 70/00 493/201 |
| 3,142,231 A | 7/1964 | Christensson | |
| 3,142,430 A | 7/1964 | Meyers | |
| 3,153,991 A * | 10/1964 | Goodrich | B31F 1/10 493/274 |
| 3,194,471 A | 7/1965 | Murphy | |
| 3,218,961 A | 11/1965 | Kraft et al. | |
| 3,240,419 A | 3/1966 | Spiering et al. | |
| 3,249,286 A | 5/1966 | Palmer | |
| 3,250,454 A | 5/1966 | Steiger | |
| 3,272,423 A | 9/1966 | Bjarno | |
| 3,324,998 A | 6/1967 | Farquhar | |
| 3,336,846 A * | 8/1967 | Berghgracht | B31B 50/00 493/178 |
| 3,357,631 A | 12/1967 | Aid et al. | |
| 3,395,623 A | 8/1968 | Baker | |
| 3,399,818 A | 9/1968 | Stegner | |
| 3,412,925 A | 11/1968 | Booth | |
| 3,428,235 A | 2/1969 | Randazzo | |
| 3,459,357 A | 8/1969 | Egger et al. | |
| 3,461,642 A | 8/1969 | Langen et al. | |
| 3,482,758 A | 12/1969 | Pierre | |
| 3,515,333 A | 6/1970 | Kotkas et al. | |
| 3,543,469 A | 12/1970 | Ullman | |
| 3,552,640 A | 1/1971 | Young | |
| 3,554,434 A | 1/1971 | Anderson | |
| 3,570,751 A * | 3/1971 | Trewella | B65D 75/5827 229/84 |
| 3,575,409 A | 4/1971 | Calvert | |
| 3,576,290 A | 4/1971 | Marchisen | |
| 3,616,027 A * | 10/1971 | Honsel | B31B 70/00 156/265 |
| 3,627,541 A | 12/1971 | Farquhar | |
| 3,637,130 A | 1/1972 | Farquhar | |
| 3,659,777 A * | 5/1972 | Kanada | B65D 75/44 206/527 |
| 3,739,545 A | 6/1973 | Lattke | |
| 3,800,677 A | 4/1974 | Jones et al. | |
| 3,878,771 A * | 4/1975 | Malcolm | B65D 5/4608 156/251 |
| RE28,554 E | 9/1975 | Curler et al. | |
| 3,945,870 A * | 3/1976 | Johnsen | A63F 3/069 156/201 |
| 3,959,950 A | 6/1976 | Fukuda | |
| 3,964,669 A | 6/1976 | Sontag et al. | |
| 3,981,494 A | 9/1976 | Prestegaard | |
| 4,011,983 A | 3/1977 | Greene | |
| 4,034,658 A | 7/1977 | Sherman | |
| 4,082,216 A | 4/1978 | Clarke | |
| 4,164,171 A | 8/1979 | Meyers et al. | |
| 4,170,928 A | 10/1979 | Beasley | |
| 4,196,035 A | 4/1980 | Reil | |
| 4,228,945 A | 10/1980 | Wysocki | |
| 4,244,281 A | 1/1981 | Kauffman et al. | |
| 4,267,955 A | 5/1981 | Struble | |
| 4,284,205 A | 8/1981 | Hirata | |
| 4,312,451 A | 1/1982 | Forbes, Jr. | |
| 4,313,542 A | 2/1982 | Roberts et al. | |
| 4,331,434 A | 5/1982 | Buschor | |
| 4,398,636 A | 8/1983 | Baxter | |
| 4,457,483 A | 7/1984 | Gagne | |
| 4,477,014 A | 10/1984 | Brandenburger | |
| 4,478,351 A | 10/1984 | Homma | |
| 4,484,683 A | 11/1984 | Werner, Jr. | |
| 4,490,960 A | 1/1985 | Klemesrud | |
| 4,494,785 A | 1/1985 | Song | |
| 4,520,615 A * | 6/1985 | Engler | B65B 9/06 493/248 |
| 4,575,000 A | 3/1986 | Gordon et al. | |
| 4,578,929 A | 4/1986 | Tisma | |
| 4,582,315 A | 4/1986 | Scarpa et al. | |
| 4,600,346 A * | 7/1986 | Podosek | B42C 7/00 281/35 |
| 4,605,464 A * | 8/1986 | Slevin | B31B 50/00 156/253 |
| 4,608,259 A | 8/1986 | Cortopassi | |
| 4,627,223 A | 12/1986 | Janhonen | |
| 4,726,170 A | 2/1988 | Sawa et al. | |
| 4,747,703 A * | 5/1988 | Cazes | B65B 9/2042 383/104 |
| 4,754,914 A | 7/1988 | Wischusen, III | |
| 4,775,771 A | 10/1988 | Pawlowski | |
| 4,785,696 A | 11/1988 | Martiny | |
| 4,793,117 A | 12/1988 | Raudat et al. | |
| 4,802,664 A | 2/1989 | Larsen | |
| 4,854,983 A | 8/1989 | Bryniarski | |
| 4,865,921 A | 9/1989 | Hollenberg | |
| 4,881,934 A | 11/1989 | Harston et al. | |
| 4,890,439 A | 1/1990 | Smart | |
| 4,919,785 A | 4/1990 | Willey et al. | |
| 4,930,639 A | 6/1990 | Rigby | |
| 4,936,935 A | 6/1990 | Beckett | |
| 4,940,200 A | 7/1990 | Sawyer | |
| 4,963,424 A | 10/1990 | Beckett | |
| 4,986,522 A | 1/1991 | Paulson | |
| 4,995,217 A | 2/1991 | Francis, Jr. | |
| 5,014,582 A | 5/1991 | Teik | |
| 5,019,029 A | 5/1991 | Calvert | |
| 5,028,147 A | 7/1991 | Graham | |
| 5,034,234 A | 7/1991 | Andreas et al. | |
| 5,071,062 A | 12/1991 | Bradley et al. | |
| 5,078,273 A | 1/1992 | Kuchenbecker | |
| 5,080,643 A | 1/1992 | Mitchell et al. | |
| 5,093,364 A | 3/1992 | Richards | |
| 5,096,723 A | 3/1992 | Turpin | |
| 5,102,385 A | 4/1992 | Calvert | |
| 5,102,485 A * | 4/1992 | Keeler | B29C 65/14 156/256 |
| 5,108,355 A * | 4/1992 | Walsh | B31B 50/00 493/110 |
| 5,117,078 A | 5/1992 | Beckett | |
| 5,132,124 A | 7/1992 | Tamaki et al. | |
| 5,154,041 A | 10/1992 | Schneider | |
| 5,175,404 A | 12/1992 | Andreas et al. | |
| 5,176,612 A | 1/1993 | Calvert et al. | |
| 5,213,902 A | 5/1993 | Beckett | |

(56) References Cited

U.S. PATENT DOCUMENTS

| | | |
|---|---|---|
| 5,221,419 A | 6/1993 | Beckett |
| 5,242,365 A | 9/1993 | Counts |
| 5,254,071 A | 10/1993 | Laroche |
| 5,260,537 A | 11/1993 | Beckett |
| 5,266,386 A | 11/1993 | Beckett |
| 5,282,349 A | 2/1994 | Siegel |
| 5,282,528 A | 2/1994 | Hudson |
| 5,326,022 A | 7/1994 | Green |
| 5,330,099 A | 7/1994 | Beales et al. |
| RE34,683 E | 8/1994 | Maynard |
| 5,337,951 A | 8/1994 | Roccaforte |
| 5,340,436 A | 8/1994 | Beckett |
| 5,346,311 A | 9/1994 | Siler et al. |
| 5,354,973 A | 10/1994 | Beckett |
| 5,410,135 A | 4/1995 | Pollart |
| 5,411,165 A | 5/1995 | Ellis |
| 5,424,517 A | 6/1995 | Habeger |
| 5,427,267 A | 6/1995 | Willman |
| 5,484,100 A | 1/1996 | Rigby |
| 5,492,269 A | 2/1996 | Sung |
| 5,510,132 A | 4/1996 | Gallo, Jr. |
| 5,519,195 A | 5/1996 | Keefer |
| 5,585,027 A | 12/1996 | Young |
| 5,615,795 A | 4/1997 | Tipps |
| 5,628,921 A | 5/1997 | Beckett |
| 5,632,368 A | 5/1997 | Moncrief |
| 5,653,671 A | 8/1997 | Reuteler |
| 5,657,610 A | 8/1997 | Dietrich et al. |
| 5,662,577 A | 9/1997 | Reuteler |
| 5,672,407 A | 9/1997 | Beckett |
| 5,688,427 A | 11/1997 | Gallo, Jr. |
| 5,746,871 A | 5/1998 | Walsh |
| 5,759,422 A | 6/1998 | Schmelzer |
| 5,772,569 A * | 6/1998 | Janhonen ............... B65D 75/38 493/128 |
| 5,800,724 A | 9/1998 | Habeger |
| 5,845,769 A | 12/1998 | Yeager |
| 5,876,319 A | 3/1999 | Holton |
| 5,921,681 A | 7/1999 | Money |
| 5,938,110 A | 8/1999 | Bernstein |
| 5,964,161 A | 10/1999 | Conway |
| 5,997,458 A | 12/1999 | Guttinger et al. |
| 6,050,063 A | 4/2000 | Ford et al. |
| 6,063,415 A | 5/2000 | Walters |
| 6,073,423 A | 6/2000 | House |
| 6,082,613 A | 7/2000 | Mikulski et al. |
| 6,114,679 A | 9/2000 | Lai |
| 6,132,351 A | 10/2000 | Lotto et al. |
| 6,139,662 A | 10/2000 | Forman |
| 6,146,028 A | 11/2000 | Preszler |
| 6,150,646 A | 11/2000 | Lai et al. |
| 6,204,492 B1 | 3/2001 | Zeng et al. |
| 6,213,286 B1 | 4/2001 | Hunter et al. |
| 6,234,384 B1 | 5/2001 | Capy et al. |
| 6,251,451 B1 | 6/2001 | Zeng |
| 6,254,519 B1 | 7/2001 | Toshima |
| 6,311,457 B1 | 11/2001 | May et al. |
| 6,312,742 B1 | 11/2001 | Wood et al. |
| 6,332,488 B1 * | 12/2001 | Walsh ............... B32B 37/0015 156/252 |
| 6,335,042 B1 | 1/2002 | Money |
| 6,349,874 B1 | 2/2002 | Hill |
| 6,360,941 B1 | 3/2002 | Larsson |
| 6,401,927 B1 | 6/2002 | Sorensen et al. |
| 6,414,290 B1 | 7/2002 | Cole |
| 6,425,847 B1 | 7/2002 | Broenstrup |
| 6,431,365 B1 | 8/2002 | Money |
| 6,433,322 B2 | 8/2002 | Zeng et al. |
| 6,455,827 B2 | 9/2002 | Zeng |
| 6,490,843 B1 | 12/2002 | May |
| 6,494,619 B1 | 12/2002 | Sulpizio |
| 6,509,052 B1 | 1/2003 | Benham et al. |
| 6,550,608 B1 | 4/2003 | Brown et al. |
| 6,552,315 B2 | 4/2003 | Zeng et al. |
| 6,635,139 B2 | 10/2003 | Bohn |
| 6,637,646 B1 | 10/2003 | Muise |
| 6,657,165 B1 | 12/2003 | Makutonin |
| 6,676,583 B2 * | 1/2004 | Walsh ............... B31B 50/00 493/132 |
| 6,677,563 B2 | 1/2004 | Lai |
| 6,683,289 B2 | 1/2004 | Whitmore et al. |
| 6,695,202 B2 | 2/2004 | Miess |
| 6,702,178 B2 | 3/2004 | Bowers et al. |
| 6,717,121 B2 | 4/2004 | Zeng |
| 6,744,028 B2 | 6/2004 | Chisholm et al. |
| 6,765,182 B2 | 7/2004 | Cole |
| 6,854,639 B2 * | 2/2005 | Walsh ............... B32B 37/12 229/164.1 |
| 6,869,387 B2 | 3/2005 | Post et al. |
| 6,915,829 B2 * | 7/2005 | Popp ............... A61F 13/15577 156/263 |
| 6,948,293 B1 * | 9/2005 | Eckermann ............... B65B 21/02 493/90 |
| 6,986,920 B2 | 1/2006 | Forman et al. |
| 6,993,889 B2 | 2/2006 | Ford et al. |
| 7,019,271 B2 | 3/2006 | Wnek et al. |
| 7,070,551 B2 | 7/2006 | Lasson |
| 7,143,930 B2 | 12/2006 | Money et al. |
| 7,414,230 B2 | 8/2008 | Fitzwater |
| 7,461,838 B2 | 12/2008 | Hendricks et al. |
| 7,473,875 B2 | 1/2009 | Fitzwater |
| 7,509,789 B2 | 3/2009 | Scholtes et al. |
| 7,510,515 B2 | 3/2009 | Ichikawa |
| 7,604,155 B2 | 10/2009 | Bossel et al. |
| 7,667,167 B2 | 2/2010 | Fitzwater |
| 7,695,421 B2 | 4/2010 | Ford |
| 7,699,214 B2 | 4/2010 | Mestre et al. |
| 7,794,147 B2 * | 9/2010 | Perelman ............... B65D 25/36 383/107 |
| 7,819,583 B2 | 10/2010 | Walker et al. |
| 7,837,606 B2 | 11/2010 | Tetenborg et al. |
| 7,893,389 B2 | 2/2011 | Fitzwater |
| 7,913,897 B2 | 3/2011 | Manaige |
| 7,935,041 B2 | 5/2011 | Graham et al. |
| 7,938,312 B2 | 5/2011 | Ford |
| 7,959,060 B2 | 6/2011 | Wilson et al. |
| 7,982,167 B2 | 7/2011 | Fitzwater |
| 7,984,844 B2 | 7/2011 | Jones |
| 8,013,280 B2 | 9/2011 | Robison et al. |
| 8,024,910 B2 | 9/2011 | Graham et al. |
| 8,025,618 B2 | 9/2011 | Walsh et al. |
| 8,066,137 B2 | 11/2011 | Sanfilippo et al. |
| 8,142,077 B2 | 3/2012 | Iannelli, II et al. |
| 8,196,805 B2 | 6/2012 | Brand et al. |
| 8,206,033 B2 | 6/2012 | Sato et al. |
| 8,226,794 B2 | 7/2012 | Fogle |
| 8,309,896 B2 | 11/2012 | Fitzwater |
| 8,317,671 B1 | 11/2012 | Zoeckler |
| 8,323,165 B2 | 12/2012 | Atoui |
| 8,403,819 B2 | 3/2013 | Zoeckler |
| 8,403,820 B2 | 3/2013 | Zoeckler |
| 8,468,782 B2 | 6/2013 | Michalsky et al. |
| 8,474,163 B2 | 7/2013 | Rubin |
| 8,500,330 B2 | 8/2013 | Nomura et al. |
| 8,579,780 B2 | 11/2013 | Senbo |
| 8,672,214 B2 | 3/2014 | Manaige |
| 8,727,204 B2 | 5/2014 | Burke |
| 8,826,959 B2 | 9/2014 | Files et al. |
| 8,870,519 B2 | 10/2014 | Karst |
| 8,961,380 B2 | 2/2015 | Langen |
| 9,050,770 B1 | 6/2015 | Russell |
| 9,073,659 B2 | 7/2015 | Smith |
| 9,108,761 B2 | 8/2015 | Fitzwater et al. |
| 9,113,648 B2 | 8/2015 | Burke |
| 9,156,579 B2 | 10/2015 | Pinkstone |
| 9,156,582 B2 | 10/2015 | Walsh et al. |
| 9,346,234 B2 | 5/2016 | Hajek et al. |
| 9,346,582 B2 | 5/2016 | Pinkstone |
| 9,463,896 B2 | 10/2016 | Fitzwater |
| 9,522,499 B2 | 12/2016 | Files et al. |
| 9,758,275 B2 | 9/2017 | Fitzwater et al. |
| 2002/0041067 A1 | 4/2002 | Muller |

(56) References Cited

U.S. PATENT DOCUMENTS

| | | | |
|---|---|---|---|
| 2002/0148882 A1* | 10/2002 | Bowers | A47G 21/001 229/87.08 |
| 2003/0002755 A1 | 1/2003 | Kim et al. | |
| 2003/0080120 A1 | 5/2003 | Whitmore et al. | |
| 2003/0144121 A1* | 7/2003 | Walsh | B65D 5/0281 493/51 |
| 2003/0185948 A1 | 10/2003 | Garwood | |
| 2003/0197051 A1* | 10/2003 | Muise | B65D 5/606 229/117.32 |
| 2003/0206997 A1 | 11/2003 | Winkelman et al. | |
| 2004/0004111 A1 | 1/2004 | Cardinale | |
| 2004/0016216 A1 | 1/2004 | Romagnoli | |
| 2004/0074947 A1 | 4/2004 | Hillebrand | |
| 2004/0101605 A1 | 5/2004 | Sigel | |
| 2004/0206049 A1 | 10/2004 | Hiramoto et al. | |
| 2005/0014623 A1* | 1/2005 | Van De Kruys | B65B 9/20 493/162 |
| 2005/0124478 A1 | 6/2005 | Scholtes et al. | |
| 2005/0272583 A1 | 12/2005 | Totani | |
| 2005/0284865 A1 | 12/2005 | Fogle et al. | |
| 2006/0009339 A1 | 1/2006 | Sleight et al. | |
| 2006/0027303 A1* | 2/2006 | Hunter | B31B 50/00 156/64 |
| 2006/0037290 A1 | 2/2006 | Smith | |
| 2006/0049190 A1 | 3/2006 | Middleton | |
| 2006/0096978 A1 | 5/2006 | Lafferty et al. | |
| 2006/0113300 A1 | 6/2006 | Wnek et al. | |
| 2006/0191929 A1 | 8/2006 | Berg, Jr. et al. | |
| 2007/0131742 A1 | 6/2007 | Fitzwater | |
| 2007/0131743 A1 | 6/2007 | Fitzwater | |
| 2007/0131744 A1 | 6/2007 | Fitzwater | |
| 2007/0131745 A1 | 6/2007 | Fitzwater | |
| 2007/0137222 A1 | 6/2007 | Kastanek et al. | |
| 2007/0138247 A1 | 6/2007 | Fitzwater | |
| 2007/0151888 A1* | 7/2007 | Bossel | B65D 75/008 206/495 |
| 2007/0267466 A1 | 11/2007 | Brand et al. | |
| 2008/0067225 A1* | 3/2008 | Moore | B65B 5/028 229/194 |
| 2008/0227612 A1 | 9/2008 | Harston | |
| 2008/0308614 A1 | 12/2008 | Fitzwater | |
| 2009/0005228 A1* | 1/2009 | Goto | B31B 70/00 493/214 |
| 2009/0039077 A1 | 2/2009 | Fitzwater | |
| 2009/0139187 A1* | 6/2009 | Wood | B65B 9/02 53/424 |
| 2009/0193757 A1* | 8/2009 | Roesler | B65B 1/02 53/138.1 |
| 2009/0197750 A1* | 8/2009 | Beckmann | B29C 65/18 493/11 |
| 2009/0214142 A1 | 8/2009 | Bossel et al. | |
| 2009/0252440 A1 | 10/2009 | Biese | |
| 2010/0022375 A1 | 1/2010 | Colla | |
| 2010/0046861 A1* | 2/2010 | Wilcoxen | B65D 33/02 383/119 |
| 2010/0066007 A1 | 3/2010 | Muller | |
| 2010/0263332 A1 | 10/2010 | Files et al. | |
| 2011/0017812 A1* | 1/2011 | Belko | B65D 5/12 229/117.27 |
| 2011/0019942 A1 | 1/2011 | Piraneo | |
| 2011/0052106 A1* | 3/2011 | Holmes | B65D 31/02 383/119 |
| 2011/0255809 A1 | 10/2011 | Tucker et al. | |
| 2011/0297680 A1 | 12/2011 | Howell et al. | |
| 2012/0224794 A1 | 9/2012 | Vender | |
| 2012/0231941 A1* | 9/2012 | Senbo | B31B 50/00 493/189 |
| 2012/0267425 A1* | 10/2012 | Whiteside | B65D 5/5028 229/100 |
| 2012/0297736 A1* | 11/2012 | Ausnit | B65B 43/145 53/456 |
| 2013/0068653 A1* | 3/2013 | Lipinski | B65D 75/02 206/524.1 |
| 2013/0202229 A1 | 8/2013 | Broering | |
| 2014/0016882 A1 | 1/2014 | Fitzwater | |
| 2014/0045666 A1 | 2/2014 | Endou et al. | |
| 2014/0113787 A1 | 4/2014 | Aganovic et al. | |
| 2014/0128235 A1* | 5/2014 | Walsh, Jr. | B65D 33/007 493/195 |
| 2014/0270592 A1 | 9/2014 | Walsh | |
| 2015/0048152 A1* | 2/2015 | Vistrom | B65D 65/403 229/182.1 |
| 2015/0072848 A1 | 3/2015 | Graham et al. | |
| 2015/0083789 A1 | 3/2015 | Fitzwater et al. | |
| 2016/0107814 A1* | 4/2016 | Fitzwater | B65D 65/08 206/1.5 |
| 2016/0318274 A1* | 11/2016 | Walsh | B31B 37/00 |
| 2016/0318275 A1* | 11/2016 | Walsh | B65D 65/14 |
| 2016/0368205 A1 | 12/2016 | Wieduwilt et al. | |
| 2017/0015079 A1 | 1/2017 | Walsh | |

FOREIGN PATENT DOCUMENTS

| | | |
|---|---|---|
| CN | 101102887 A | 1/2008 |
| CN | 103434294 A | 12/2013 |
| DE | 1 060 313 | 6/1959 |
| DE | 11 47 379 B | 4/1963 |
| DE | 18 10 965 A1 | 10/1970 |
| DE | 203 00 817 | 4/2003 |
| EP | 0 729 828 A2 | 9/1996 |
| EP | 1 072 526 | 1/2001 |
| EP | 1 424 290 A2 | 6/2004 |
| EP | 1 452 458 | 9/2004 |
| EP | 1 457 425 | 9/2004 |
| EP | 1 353 843 B1 | 4/2005 |
| EP | 1 798 159 A1 | 6/2007 |
| EP | 1 964 785 | 9/2008 |
| EP | 2 487 027 | 8/2012 |
| EP | 2 492 203 | 8/2012 |
| EP | 2 492 204 | 8/2012 |
| EP | 2 748 078 B1 | 10/2016 |
| EP | 2 505 347 B1 | 12/2016 |
| FR | 1 048 714 A | 12/1953 |
| FR | 2 516 481 | 5/1983 |
| FR | 2 665 882 | 2/1992 |
| FR | 2 687 384 | 8/1993 |
| GB | 632554 | 11/1949 |
| GB | 2 351 035 A | 12/2000 |
| GB | 2 365 000 | 2/2002 |
| JP | S61-232175 | 10/1986 |
| JP | 62-16319 | 1/1987 |
| JP | S63-502418 | 9/1988 |
| JP | 5-28626 | 4/1993 |
| JP | 5-147664 | 6/1993 |
| JP | 2004 224402 | 8/2004 |
| JP | 2005-320022 A | 11/2005 |
| JP | 2006-240671 A | 9/2006 |
| JP | 2008-105707 A | 5/2008 |
| JP | 2011-168330 | 9/2011 |
| JP | 2011-168331 | 9/2011 |
| JP | 2011-173640 | 9/2011 |
| JP | 2011-189978 A | 9/2011 |
| JP | 2010-222050 | 10/2011 |
| JP | 2011-251774 A | 12/2011 |
| JP | 2012-51579 | 3/2012 |
| JP | 2012-152901 | 8/2012 |
| JP | 2012-187899 | 10/2012 |
| JP | 2012-533487 | 12/2012 |
| JP | 2018-039167 | 3/2018 |
| NL | 87 840 C | 11/1957 |
| WO | WO 87/03249 | 6/1987 |
| WO | WO 2006/052326 | 5/2006 |
| WO | WO 2007/067705 | 6/2007 |
| WO | WO 2007/084525 A2 | 7/2007 |
| WO | WO 2008/086277 | 7/2008 |
| WO | WO 2009/023286 | 2/2009 |
| WO | WO 2011/011283 A2 | 1/2011 |
| WO | WO 2011/031545 A2 | 3/2011 |
| WO | WO 2011/040994 A1 | 4/2011 |
| WO | WO 2013/003149 A | 1/2013 |
| WO | WO 2013/117983 A2 | 8/2013 |

(56) References Cited

FOREIGN PATENT DOCUMENTS

| WO | WO 2014/070232 A1 | 5/2014 |
|---|---|---|
| WO | WO 2015/028825 A1 | 3/2015 |
| WO | WO 2016/176540 A1 | 11/2016 |

OTHER PUBLICATIONS

International Search Report and Written Opinion for PCT/US2016/047521 dated Dec. 13, 2016.
Supplementary Partial European Search Report for EP 14 84 9557 dated Mar. 7, 2017.
International Search Report and Written Opinion for PCT/US2016/043520 dated Oct. 28, 2016.
International Search Report and Written Opinion for PCT/US2014/057385 dated Jan. 30, 2015.
International Search Report and Written Opinion for PCT/US2016/029989 dated Aug. 16, 2016.
International Search Report and Written Opinion for PCT/US2016/030046 dated Aug. 19, 2016.
Supplementary European Search Report for EP 16 82 5077 dated Mar. 4, 2019.
Supplementary European Search Report for EP 16 78 7209 dated Dec. 17, 2018.
Supplementary European Search Report for EP 14 84 9557 dated Jun. 7, 2017.
Office Action for Canadian Application No. 2,980,354 dated Oct. 1, 2018.
Office Action for Chinese Application No. 201680024662.X dated Nov. 1, 2018, with English translation.
Supplementary European Search Report for EP 16 78 7218 dated Jan. 28, 2019.
Notification of the First Office Action for Chinese Application No. 201680041116.7 dated Jan. 4, 2019, with English translation.

* cited by examiner

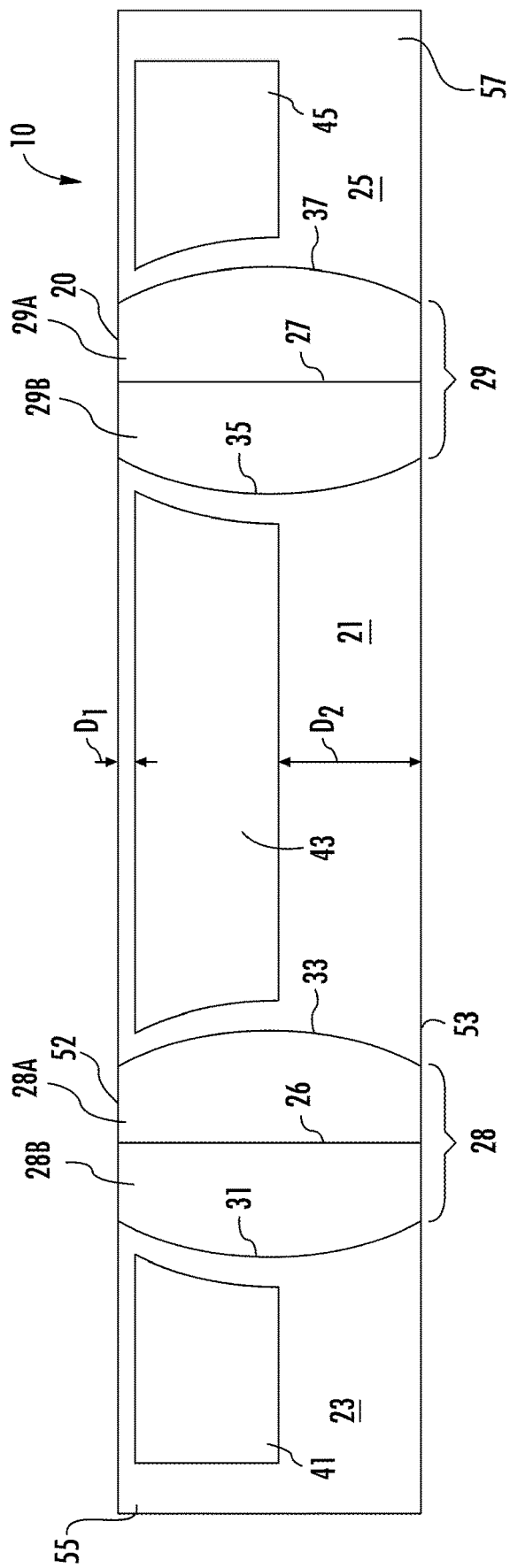
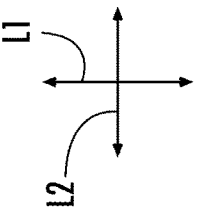
FIG. 2

METHOD AND SYSTEM FOR FORMING PACKAGES

CROSS-REFERENCED TO RELATED APPLICATIONS

This application claims the benefit of U.S. Provisional Patent Application No. 62/179,172, filed on Apr. 29, 2015.

INCORPORATION BY REFERENCE

The disclosure of U.S. Provisional Patent Application No. 62/179,172, which was filed on Apr. 29, 2015, is hereby incorporated by reference for all purposes as if presented herein in its entirety.

BACKGROUND OF THE DISCLOSURE

The present disclosure generally relates to reinforced packages for holding products and to methods of forming the packages. More specifically, the present disclosure is directed to methods and systems for forming the packages including a reinforcing sleeve for supporting a bag.

Bags, such as paper or plastic bags, traditionally have been used for the packaging and transport of products from bulk materials such as rice or sand to larger items. Bags generally are cheap and easy to manufacture and can be formed in different configurations and sizes, and can be used for storage and transport of a wide variety of products. In particular, in the Fast Food industry, bags are frequently used for packaging of prepared food items, such as sandwiches, etc. Currently, there is a growing demand for bags or similar packages for use in packaging various products, including sandwiches, French fries, and other prepared food items, that a worker can easily open, such as with one hand, and have the bag supported in an open configuration to enhance the efficiency of packaging of such products. However, it is equally important that the costs of such bags necessarily must be minimized as much as possible. While various bag designs including reinforcing or supporting materials have been developed, often, the manufacture of such specialty bags having reinforcing layers or materials supplied thereto has required multiple stages or operations, which can significantly increase the cost of manufacture of such bags.

SUMMARY OF THE DISCLOSURE

In general, one aspect of the disclosure is directed to a method of forming reinforced packages. The method can comprise forming an attached web by adhering a blank to a web of material and moving the attached web in a downstream direction through at least a tube forming assembly and a carton forming assembly. The moving the attached web can comprise moving the blank with the web of material. The method also can comprise at least partially forming a tube by folding at least a portion of the web of material as the attached web moves through the tube forming assembly, forming a reinforcement sleeve by folding at least a portion of the blank so that the reinforcement sleeve extends at least partially around the tube as the attached web moves through the carton forming assembly, and forming a reinforced package comprising the reinforcement sleeve and a tube portion by separating the tube portion from a remainder of the tube, the reinforcement sleeve being adhered to the tube portion.

In another aspect, the disclosure is generally directed to a system for forming reinforced packages. The system can comprise an attachment assembly receiving a web of material and a blank. The attachment assembly can bring the blank into engagement with the web of material for forming an attached web. A tube forming assembly can be disposed downstream from the attachment assembly. The tube forming assembly can receive the attached web and can comprise web folding features for folding at least a portion of the web of material to at least partially form a tube. A carton forming assembly can be disposed downstream from the attachment assembly. The carton forming assembly can receive the attached web and can comprise carton folding features for folding at least portion of the blank over the tube to form a reinforcement sleeve. The system further can comprise a cutting assembly comprising cutting features for separating a tube portion from the web of material to at least partially form a reinforced package comprising the tube portion attached to the reinforcement sleeve.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

FIG. 2 is a plan view of a blank for forming a reinforcing construct of the reinforced package of FIG. 1.

DETAILED DESCRIPTION OF THE EXEMPLARY EMBODIMENTS

The present disclosure generally relates to a system and method of forming reinforced packages for holding products such as food products or other articles. Packages according to the present disclosure can accommodate articles of any shape. The packages can comprise a bag or liner comprising a relatively flexible material attached to a reinforcing construct comprising a relatively rigid material (e.g., paperboard). The bags can generally be made from a paper, plastic, laminate, or other stock material and can be attached to the reinforcing construct that can be located between the opened end and sealed or closed end of the bag. In one embodiment, the bags comprise polyethylene material or any other suitable heat-sealable material. The reinforcing construct can be of varying widths and can extend about or over the closed ends of the bags, in some embodiments enclosing such closed ends, and will provide support for the bags upon loading with a product or article or series of articles therein. In some embodiments, the reinforcing constructs can be folded with their bags into a configuration supporting the bags in a freestanding, upright, and opened condition for ease of loading.

Figure 1:
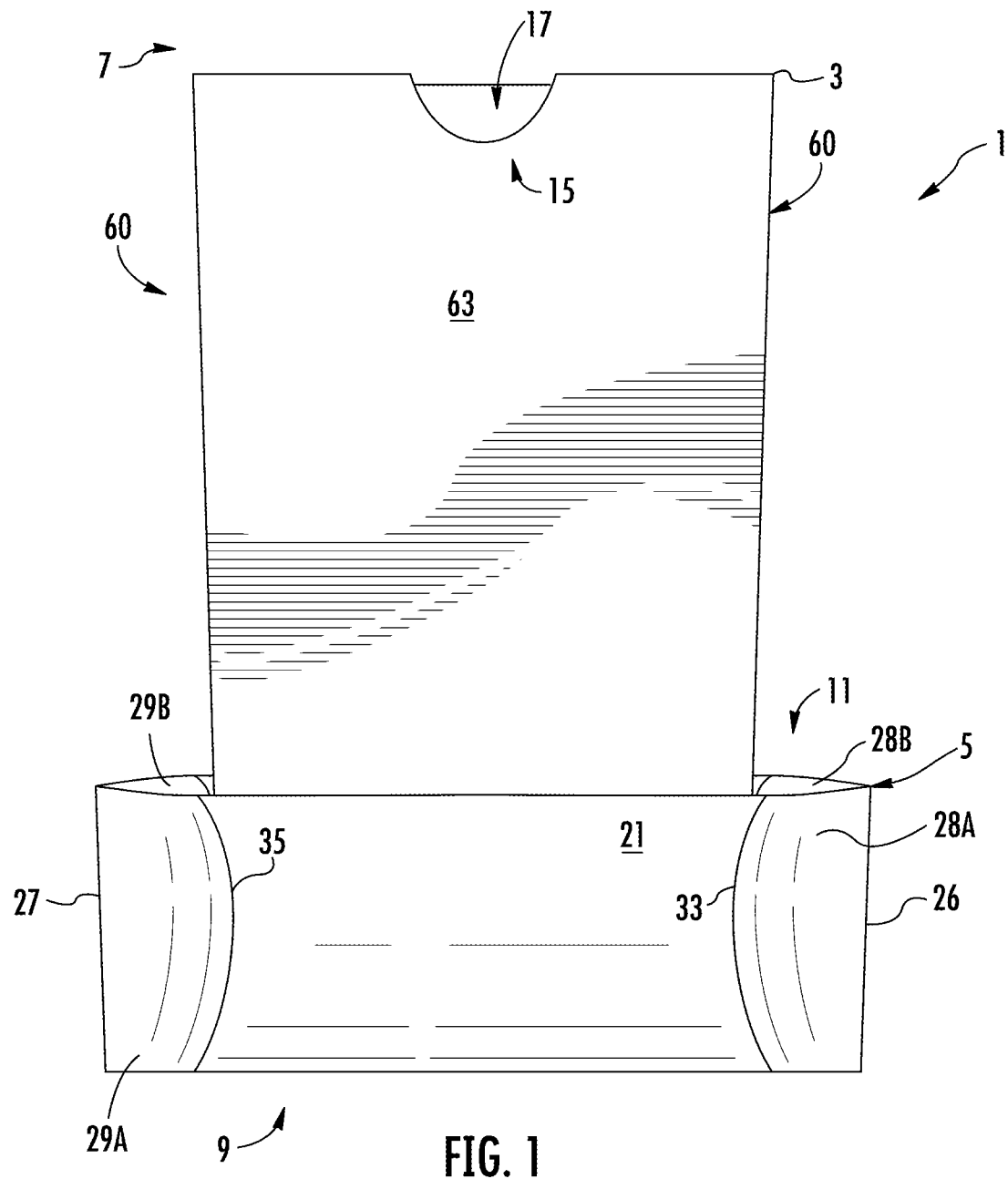
FIG. 1 is a perspective side view of a reinforced package in a flattened condition formed according to a system and method of forming reinforced packages according to an exemplary embodiment of the disclosure
Figure 3:
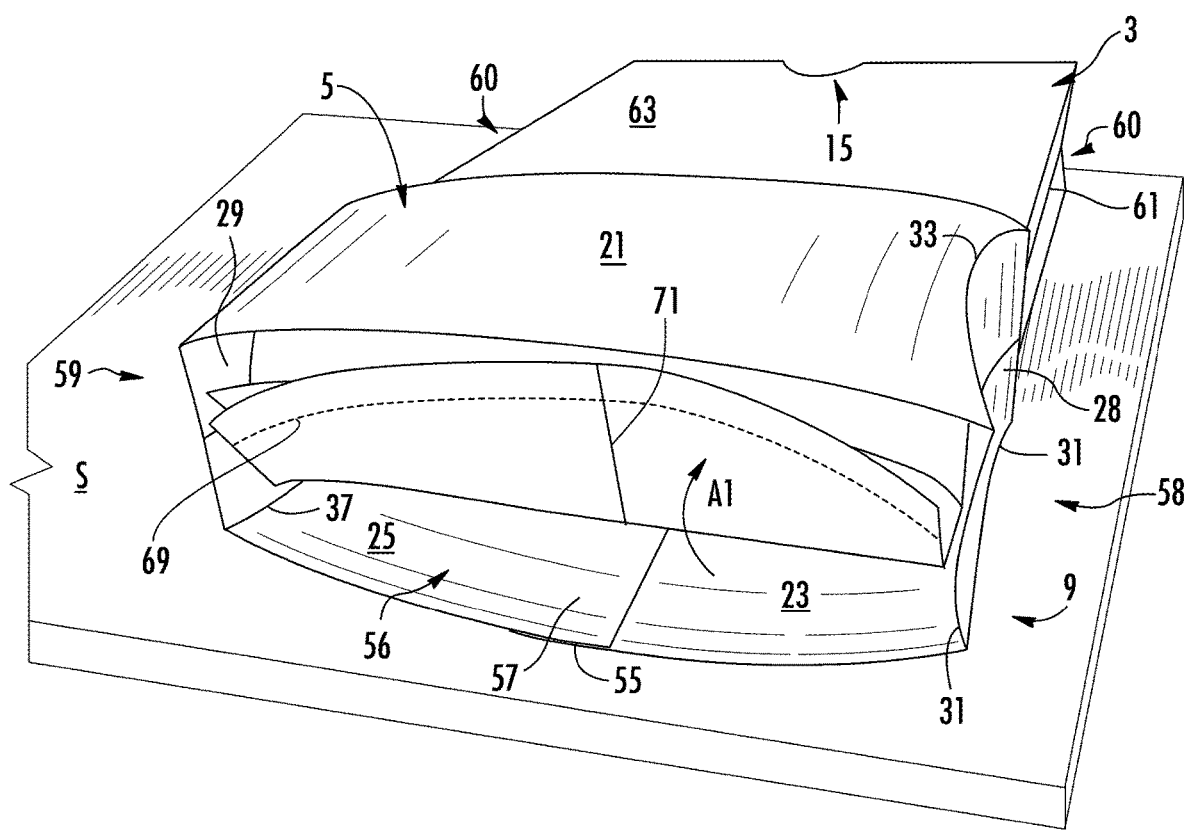
FIGS. 3 and 4 are perspective views of the reinforced package of FIG. 1 in an opened condition.
Figure 4:
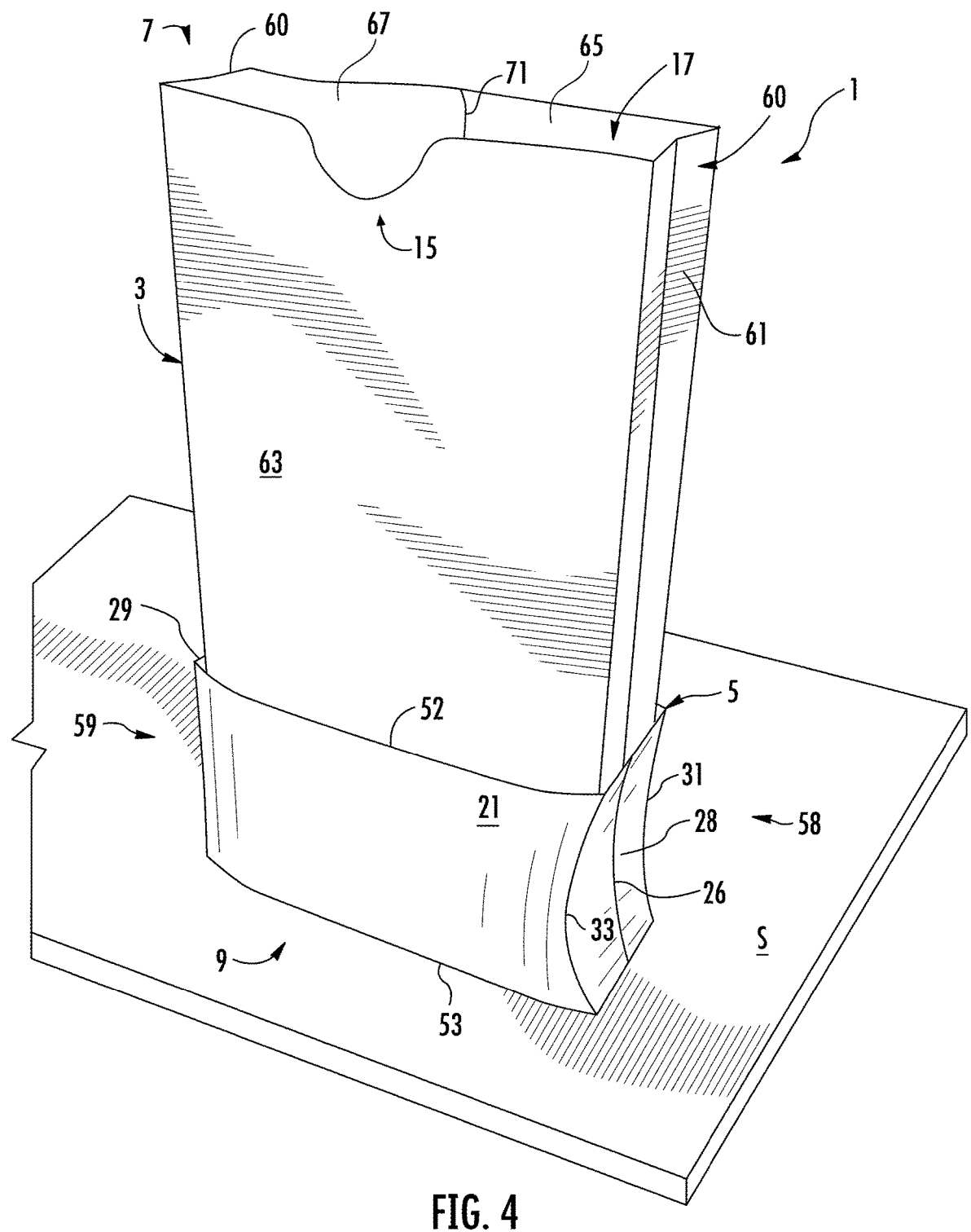

FIG. 1 illustrates a reinforced package generally indicated at 1 that can be formed by one embodiment of the system and method of the present disclosure. The package 1 includes a bag 3 and a reinforcing construct or sleeve 5 attached to the bag 3. The bag has an open end 7, a closed end 9 (FIG. 3), and an interior space 17 for holding a product. In one embodiment, the bag 3 has gusseted sides 60 including a fold line 61 (FIGS. 3 and 4) extending the length of the bag on each side to facilitate forming the gusseted side. The gussets 60 can extend between a central portion 63 (e.g., the front of the bag 3) and respective marginal portions 65, 67, which can form the back of the bag 3. In the illustrated embodiment, the marginal portions 65, 67 can be at least partially overlapped with one another and adhered to one another to form a longitudinal seam 71 extending along the height of the bag 3 (FIG. 4). As shown in FIG. 3, the closed end 9 can be at least partially closed by a transverse seal or seam 69 where the walls (e.g., the gussets 60, the central portion 63, and the marginal portions 65, 67) have been heat sealed and/or adhered together along a section of the bag 3. The interior space 17 may be accessible through a notch 15 in the bag 3. The reinforcing sleeve 5 is configured to at least partially receive a portion 11 of the closed end 9 of the bag 3. Alternatively, the reinforcing sleeve 5 could be positioned to extend around the middle portion or top portion of the bag 3 without departing from the disclosure.

FIG. 2 illustrates a blank 10 for forming the reinforcing sleeve 5. The blank has a lateral axis L1 and a longitudinal axis L2. In the illustrated embodiment, the blank 10 has a front panel 21 foldably connected to a first side panel 28 at a first arcuate fold line 33. The first side panel 28 includes two individual panel portions 28A, 28B foldably connected to one another at a lateral fold line 26. A first back panel 23 is foldably connected to the first side panel 28 at a second arcuate fold line 31. A second side panel 29 is foldably connected to the front panel 21 at a third arcuate fold line 35. The second side panel 29 includes two individual panel portions 29A, 29B foldably connected to one another at a lateral fold line 27. A second back panel 25 is foldably connected to the second side panel 29 at a fourth arcuate fold line 37. In the illustrated embodiment, the arcuate fold lines 31, 33 are spaced apart from the lateral fold line 26 and are concave with respect to the lateral fold line 26. Similarly, the arcuate fold lines 35, 37 are spaced apart from the lateral fold line 27 and are concave with respect to the lateral fold line 27. In alternative embodiments, the blank 10 can have alternative panel, fold line, and/or panel portion arrangements. U.S. patent application Ser. No. 13/826,937, filed Mar. 14, 2013, is incorporated by reference herein for all purposes, and illustrates various reinforced packages including various reinforcing constructs 5, blanks 10, and bags 3 that can be formed from the method and system of the present disclosure.

In the illustrated embodiment, the blank 10 can include one or more adhesive regions 41, 43, and 45 on the first back panel 23, front panel 21, and/or second back panel 25, respectively, for receiving adhesive and being fixedly attached to an exterior surface of the bag 3. Furthermore, the blank 10 has a first edge 52 and a second edge 53 extending in the longitudinal direction L2. In one embodiment, the adhesive regions 41, 43, 45 are separated from the first edge 52 by a first distance D1 and are separated from the second edge 53 by a second distance D2. In one embodiment, the first distance D1 is less than the second distance D2. The first and second side panels 28, 29 and regions separate from the adhesive regions 41, 43, 45 may be generally free from adhesive in some embodiments, or may include adhesive in alternative embodiments. Additionally, the first and second distances D1, D2, adhesive regions 41, 43, 45, and/or edges 52, 53 can be otherwise arranged, shaped, modified, or omitted without departing from the scope of this disclosure. For example, the first distance D1 and the second distance D2 could be generally equal or the first distance D1 could be greater than the second distance D2.

Generally, the blank 10 may be folded about fold lines 26, 27 to create the reinforcing sleeve 5. For example, distal ends 55, 57 of the first and second back panels 23, 25 may be overlapped, and the sleeve 5 attached to the bag 3 as illustrated in FIGS. 1, 3, and 4. In one embodiment, the glue regions or another adhesive can extend into one or both of the distal ends 55, 57 so that the overlapped portions of the back panels 23, 25 are adhered to one another when the reinforcement sleeve 5 is formed. The individual panel portions 28A, 28B, 29A, and 29B may be in face-to-face registration in a first, non-erect position of the bag 3 as illustrated in FIG. 1. The first, non-erect position illustrated reduces and/or minimizes a volume of the interior space 17 such that the package 1 is in a non-erect or flattened state. The non-erect state may facilitate easy stacking of a plurality of packages into, for example, a shipment container and subsequent organization at a destination facility. The individual panel portions 28A, 28B, 29A, and 29B may be flexed or positioned to form first and second sides 58, 59 of the package 1 in a second, erect position of the bag 3 as illustrated in FIGS. 3 and 4. The second, erect position illustrated increases and/or maximizes a volume of the interior space 17 such that the package 1 is in an erect or self-supporting state. The closed end 9 of the bag 3 can extend upwardly into an interior 56 of the sleeve 5 in the direction of arrow A1 while the package is in the erect state (FIG. 3). Furthermore, the bottom edge 53 forms a support when the package 1 is in the erect state for contacting a surface S (FIG. 4). The support formed of the bottom edge 53 maintains the package in an upright position on the surface S. As further illustrated in FIGS. 3 and 4, the gusseted sides 60 of the bag 3 may be maintained extended when the package 1 is in the erect state. Other intervening states of the package 1 including intermediate states whereby the package 1 is not fully erected are also applicable according to some embodiments. Furthermore, additional reinforcing sleeves of differing configurations are also applicable according to some embodiments. The reinforced package 1 may be otherwise shaped, arranged, and configured without departing from the disclosure.

Figure 5:
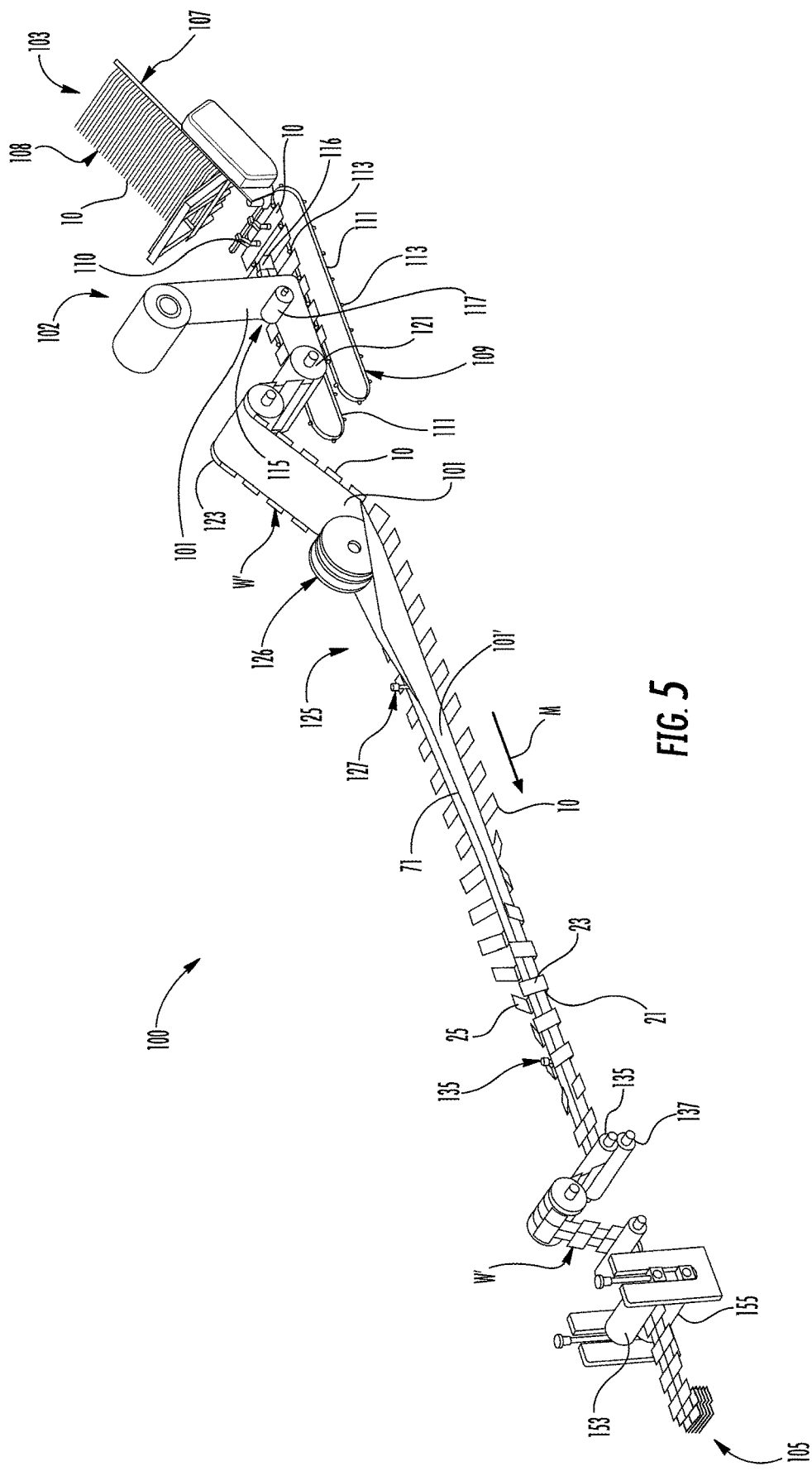
FIG. 5 is a schematic illustration of the system and method of forming the reinforced packages of FIG. 1 according to the exemplary embodiment of the disclosure.

FIG. 5 generally illustrates an example embodiment of a system and method 100 for forming the reinforced packages (e.g., reinforced packages 1) in accordance with the disclosure. In the illustrated embodiment, the packaging system 100 attaches a web of material 101 for forming the bags 3 of the packages 1 to the blanks 10, and the attached blanks and web move through a respective packaging system from an upstream end 103 to a downstream end 105 generally in a machine direction M (e.g., the downstream direction), and are formed into the individual packages by various portions and components of the system as discussed further below.

As illustrated in FIG. 5, in the system and method 100 for manufacturing reinforced packages 1, the web of bag material 101, which can include preprinted or unprinted paper, polyethylene, laminates, or other material including flexible and heat-sealable materials, for example, is fed from a roll or supply 102. In one embodiment, the bag material 101 can be preprinted with various designs, lettering, labels and/or other graphics and can be perforated, printed roll stock that can include patterned adhesive that is positioned to facilitate forming the web 101 into bags 3 in the formed packages 1.

Figure 6A:
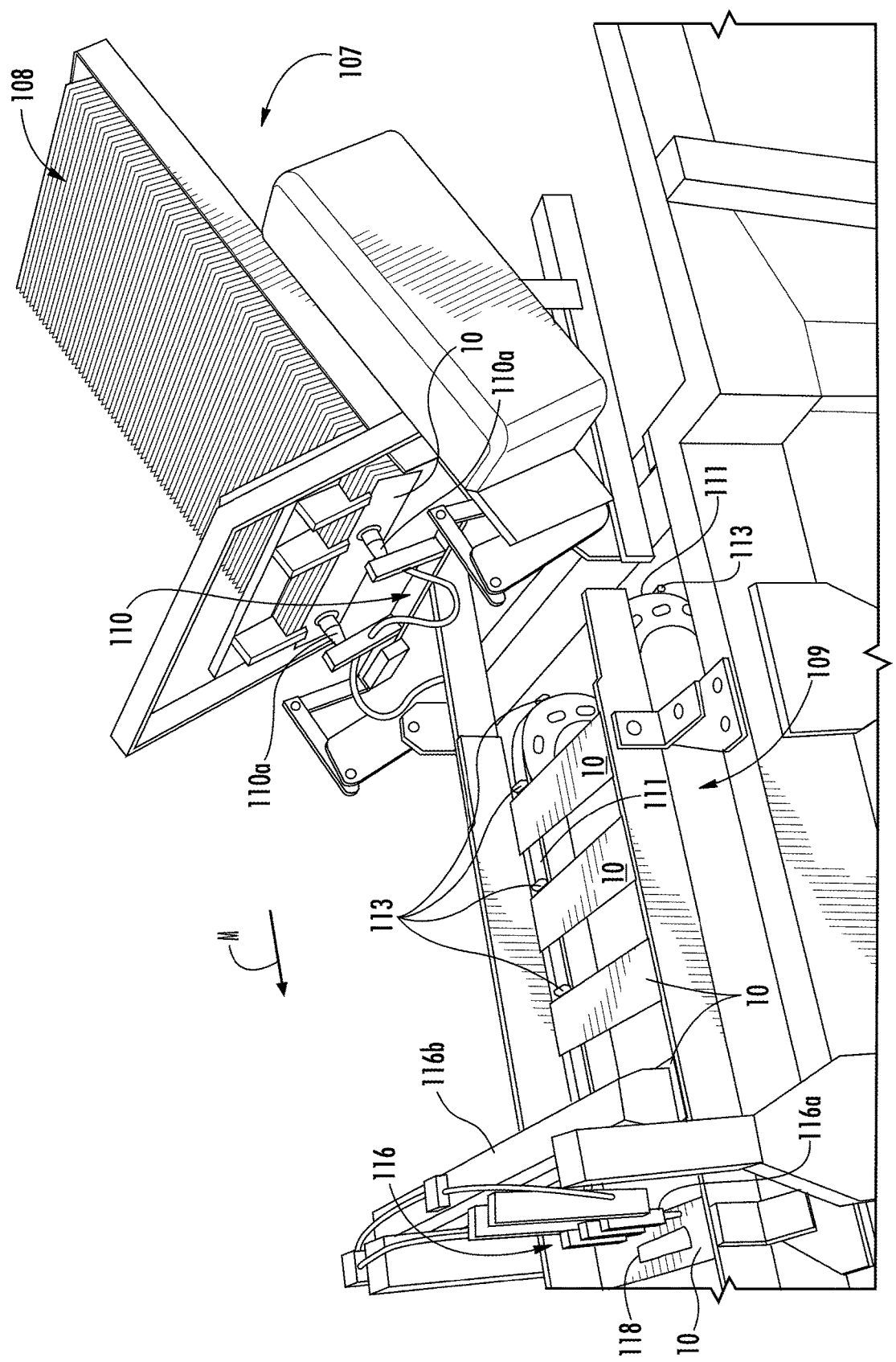
FIGS. 6A-8 are perspective views of a carton feeder, an adhesive applicator, and an attachment assembly of the system of FIG. 5 schematically showing the carton feeder, the adhesive applicator, and the attachment assembly feeding blanks and attaching the blanks to a web of material to form an attached web according to the exemplary embodiment of the disclosure.
Figure 6B:
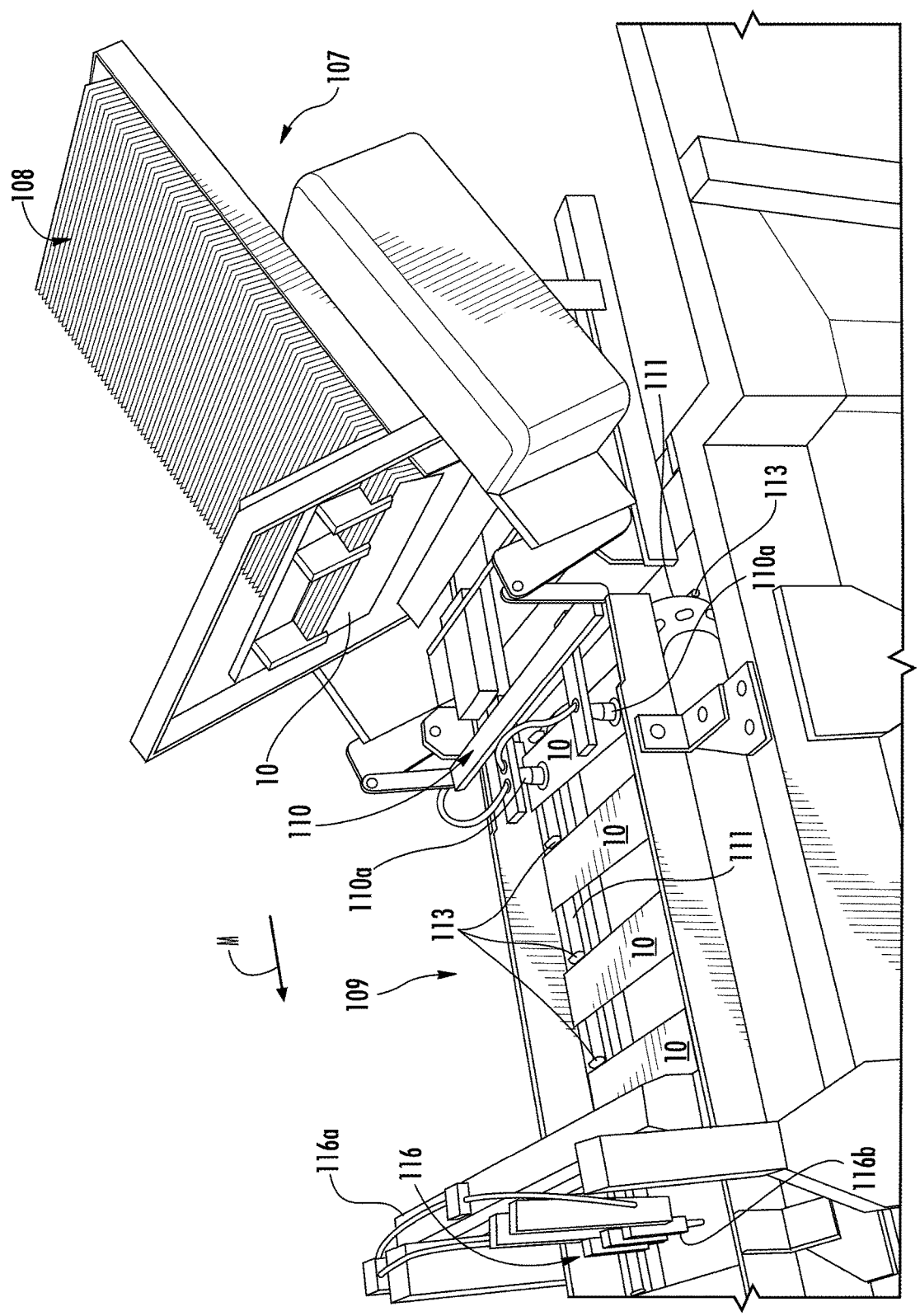

In one embodiment, a carton feeder 107 is positioned at the upstream end 103 of the system 100 and includes a stack 108 of carton blanks 10 that are fed to a blank conveyor 109. As shown in FIGS. 6A and 6B, the carton feeder 107 is a pick and place type carton feeder that includes an arm 110 with suction cups 110a or any other suitable actuator for holding a blank 10. As shown in FIG. 6A, the arm 110 is positioned adjacent a blank 10 in the stack 108 and the suction cups 110a can engage the blank 10 (e.g., with vacuum pressure) so that the arm 110 can carry the blank. As shown in FIG. 6B, the arm 110 can be moved to the position shown in FIG. 6B so that the arm 110 removes the blank 10 from the stack 108 and transfers it to the blank conveyor 109. The suction cups 110a can release the blank 10 on the blank conveyor 109, the placement arm 110 can move back to the position shown in FIG. 6A to retrieve another blank 10, and the blank conveyor 109 can move the blanks 10 in the machine direction M towards the web 101 of bag material. The carton feeder could comprise other types of feeders such as mechanisms that convey blanks 10 directed from a blank cutting station, or any other suitable types of feeders or other mechanisms without departing from the disclosure.

Figure 7:
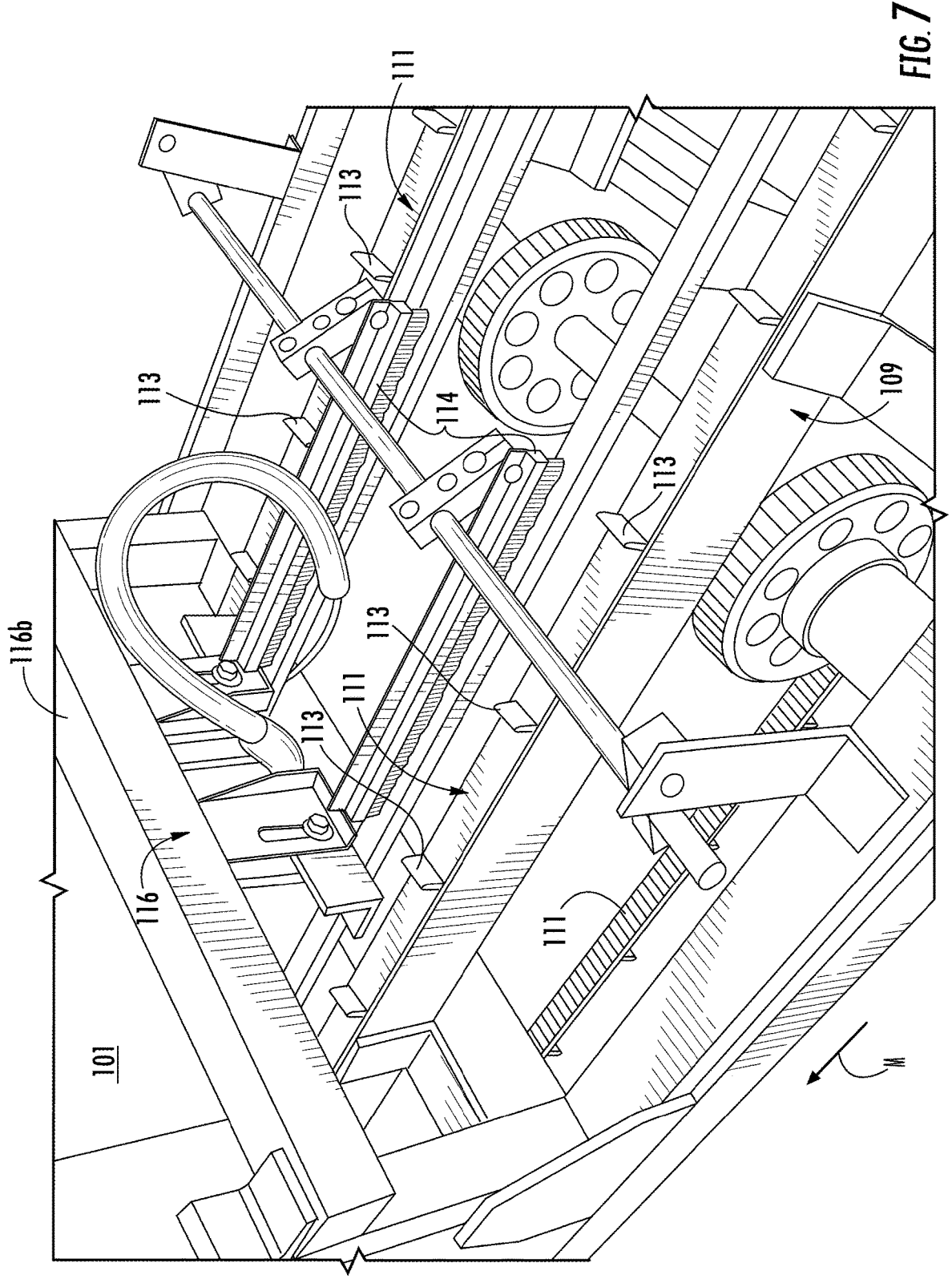

As shown in FIGS. 6A, 6B, and 7, the blank conveyor 109 includes two spaced apart lug belts or tracks 111 with lugs 113 for engaging a series of blanks 10 and conveying the blanks in the machine direction M. In the illustrated embodiment, the lug belts 111 can be endless belts, each with a plurality of the lugs 113 spaced along the respective belt. In one embodiment, the lugs 113 can be spaced on the lug belts 111 by approximately the height of the bags 3 in the reinforced packages 1. The blank conveyor 109 receives the blanks 10 from the carton feeder 107 (FIG. 6B) and moves the series of blanks 10 from the carton feeder 107 to an attachment assembly 115 of the packaging system 100 wherein the web of material 101 is attached to the blanks 10 by adhesive. As shown in FIG. 7, the blank conveyor 109 can include one or more brushes 114 or other suitable features that can engage the blanks 10 as the lug belts 111 move the blanks 10 past the brushes 114. Accordingly, as the lug belts 111 move the blanks 10 downstream, the brushes 114 can drag against the blanks 10 and push the blanks against the respectively adjacent lugs 113 so that, for example, the blanks 10 can be properly positioned for attachment to the web of material 101 in the attachment assembly 115. Subsequently, the lugs 113 can push the respective blanks 10 toward the attachment assembly 115 overcoming the resistance of the brushes 114.

Figure 8:
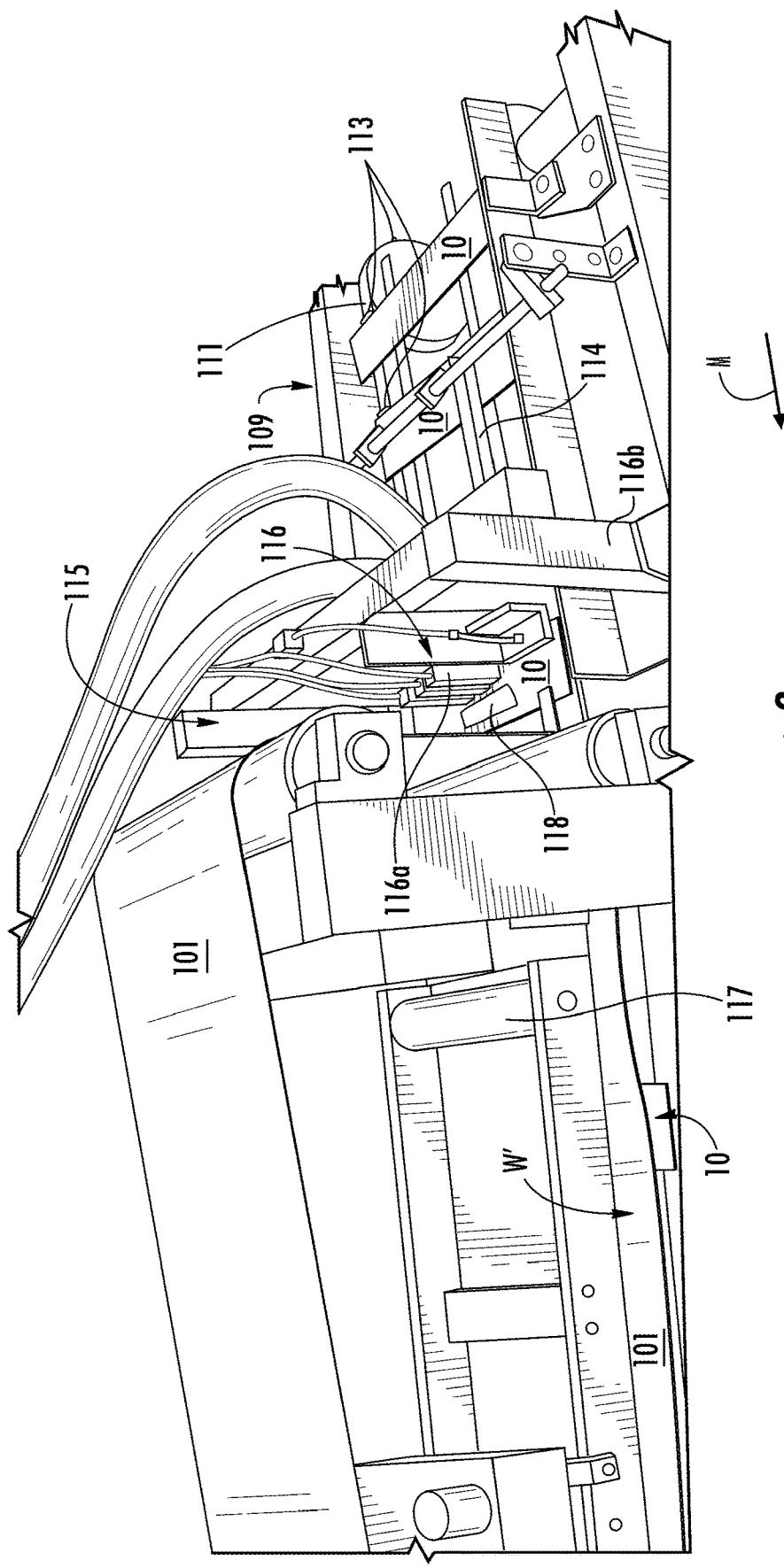

In the illustrated embodiment, the attachment assembly 115 of the system 100 includes an adhesive applicator 116 (FIGS. 5-8) for applying adhesive to the blanks 10 (e.g., at the adhesive region 43). In one embodiment, the adhesive applicator 116 can include one or more adhesive outlets 116a mounted on a frame 116b above the blank conveyor 109 so that the adhesive applicator 116 can apply an adhesive (e.g., adhesive 118 shown schematically in FIGS. 6A and 8) to the upper surfaces of the blanks 10 as they pass under the adhesive applicator 116 and prior to engaging the blanks 10 with the web of material 101. As shown in FIG. 8, the web of material 101 can be unrolled from the roll 102 over one or more rollers and directed to move in the machine direction over (e.g., generally parallel to) the lug belts 111 so that the web of material 101 can be brought into contact with the blanks 10 in the attachment assembly 115. In the illustrated embodiment, the attachment assembly 115 can include an adhesive compression nip roller 117 (FIGS. 5 and 8) downstream from the adhesive applicator 116 over the web of material 101. An opposing nip roller or other surface (not shown) can be disposed below the blanks 10. Accordingly, the nip rollers can receive the web of material 101 and the blanks 10 and press the web of material 101 against the blanks 10 to adhesively attach the web to the blanks via the adhesive 118, for example. In one embodiment, the nip roller 117 and the opposing roller can be disposed between the lug belts 111 so that the lugs 113 can pass by the rollers. The blank 10 can be attached to the web 101 by other suitable mechanisms without departing from the disclosure.

Figure 9:
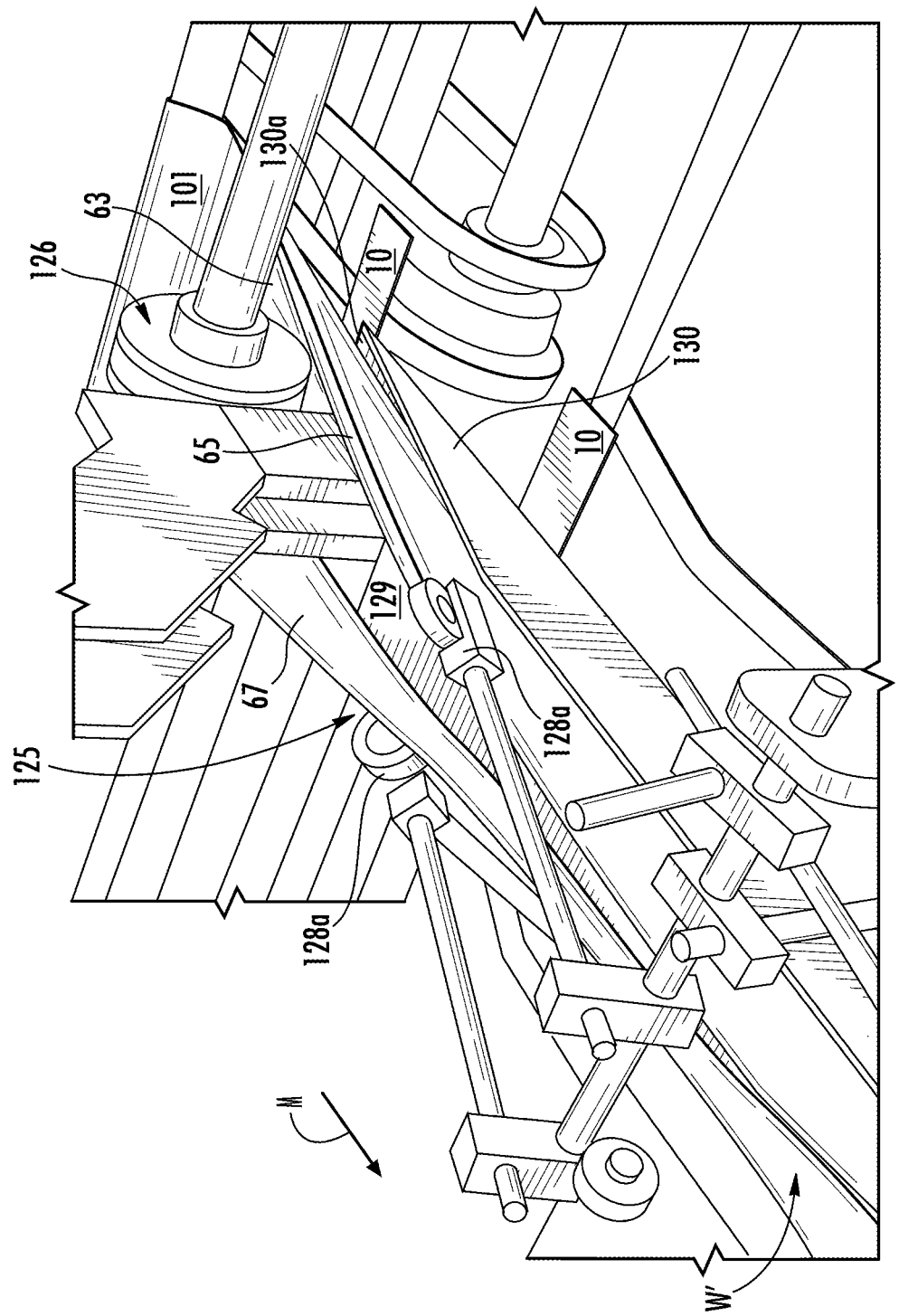
FIGS. 9-11 are perspective views of a tube forming assembly of the system of FIG. 5 schematically showing the tube forming assembly forming a tube of the web of material according to the exemplary embodiment of the disclosure.

In one embodiment, as schematically shown in FIG. 5, the web 101 with blanks 10 attached (hereinafter the attached web W') travels from the blank conveyor 109 through a series of rollers 121, 123 and to a tube forming assembly 125 of the system 100. The tube forming assembly 125 can include web folding features for forming the web of material 101 into an open-ended tube 101'. In one embodiment, as shown in FIGS. 5 and 9-11, the tube forming assembly 125 can include a forming roll 126, guide rollers 128a, an inner forming plate 129, and two outer guide plates 130 that form and shape the web 101 into the tube 101' having the side gussets 60 and fold lines 61 (FIGS. 3 and 4). As shown in FIG. 9, the forming roll 126 can engage the central portion 63 of the web of material 101, and the marginal portions 65, 67 of the web of material 101 can fold upwardly at the forming roll 126 to the guide rollers 128a. In the illustrated embodiment, the guide rollers 128a can direct the marginal portions 65, 67 over the inner forming plate 129 and between the outer guide plates 130. Additional guide rollers 128b (FIG. 10) downstream from the guide rollers 128a can further direct the marginal portions 65, 67 to overlap one another on the inner forming plate 129. In one embodiment, the inner forming plate 129 can be spaced apart from the central portion 63 of the web of material so that the gusset portions 60 extend generally vertically between the central portion 63 and the respective marginal portions 65, 67 and adjacent to the respective outer guide plates 130. Accordingly, the marginal portions 65, 67 of the web of material 101 are engaged between the inner forming plate 129 and the guide rollers 128a, 128b to move the marginal portions from being generally planar with the central portion 63 (e.g., upstream from the forming roll 126) to being at least partially overlapped with one another and extending over the central portion 63 downstream from the guide rollers 128a.

Figure 10:
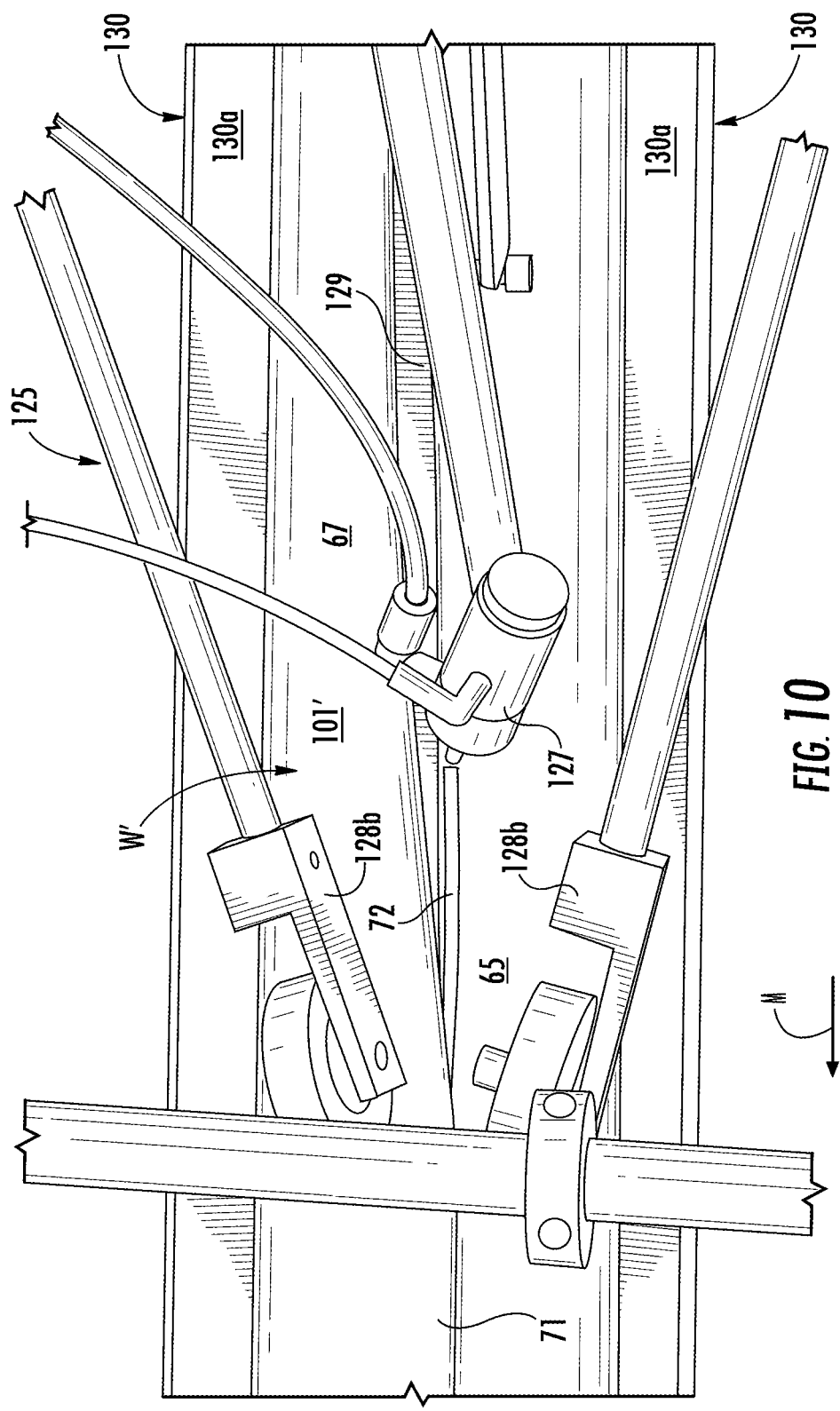
Figure 11:
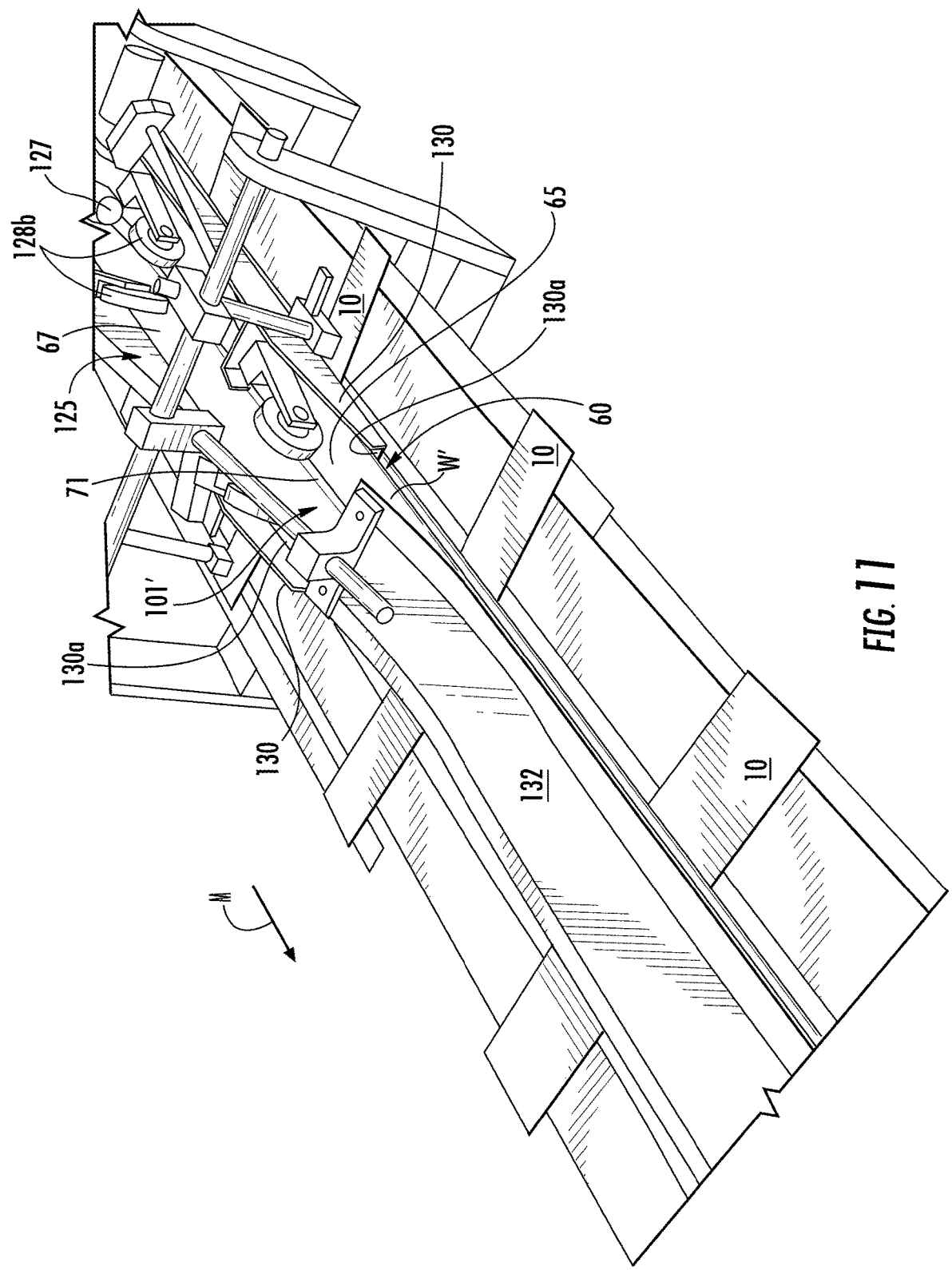

As shown in FIG. 10, the tube forming assembly 125 includes a web adhesive applicator 127 that applies adhesive (e.g., an adhesive 72 schematically shown in FIG. 10) to the web 101 as the web is being formed into the tube 101'. The adhesive 72 can be applied to one or both of the marginal portions 65, 67 by the adhesive applicator 127 as they are overlapped to form a longitudinal seam 71 in the tube 101' (FIGS. 10 and 11). As shown in FIG. 4, the longitudinal seam 71 can form a back of the bag 3 in the formed package 1. The seam 71 could be otherwise formed without departing from the scope of the invention. As shown in FIG. 11, the gussets 60 of the tube 101' can be formed by the inner forming plate 129, the outer guide plates 130, and a flexible plate 132 disposed downstream from the inner forming plate and the outer guide plates. In one embodiment, the inner forming plate 129 can be angled downwardly so that the upstream end of the inner forming plate 129 (FIG. 9) is spaced farther from the central portion 63 of the web of material 101 than the downstream end of the forming plate (not shown). Additionally the outer guide plates 130 can each include an inwardly-directly horizontal plate 130a (FIGS. 9-11), and the outer guide plates 130 with the horizontal plates 130a can be angled inwardly so that the outer guide plates 130 are spaced farther apart from one another at the upstream end (FIG. 9) of the outer guide plates than at the downstream end (FIG. 11) of the outer guide plates. Accordingly, in one embodiment, as the attached web W' moves in the machine direction M, the inner forming plate 129 can lower the overlapped marginal portions 65, 67 and the longitudinal seam 71 toward the central portion 63 of the tube 101' while the horizontal plates 130a push the gusset portions 60 of the tube 101' inwardly. As shown in FIG. 11, as the tube 101' moves downstream from the inner forming plate 129 and the outer guide plates 130, the portions of the gussets 60 adjacent the respective marginal portions 65, 67 overlap the portions of the gussets 60 adjacent the central portion 63 between the central portion 63 and the respective marginal portions 65, 67. The flexible plate 132 can apply downward pressure on the tube 101' to help form the fold lines of the gussets 60, to help adhere the marginal portions 65, 67 together via the adhesive 72, and/or to generally flatten the tube 101'. The tube forming assembly 125 could be otherwise configured without departing from the disclosure.

Figure 12:
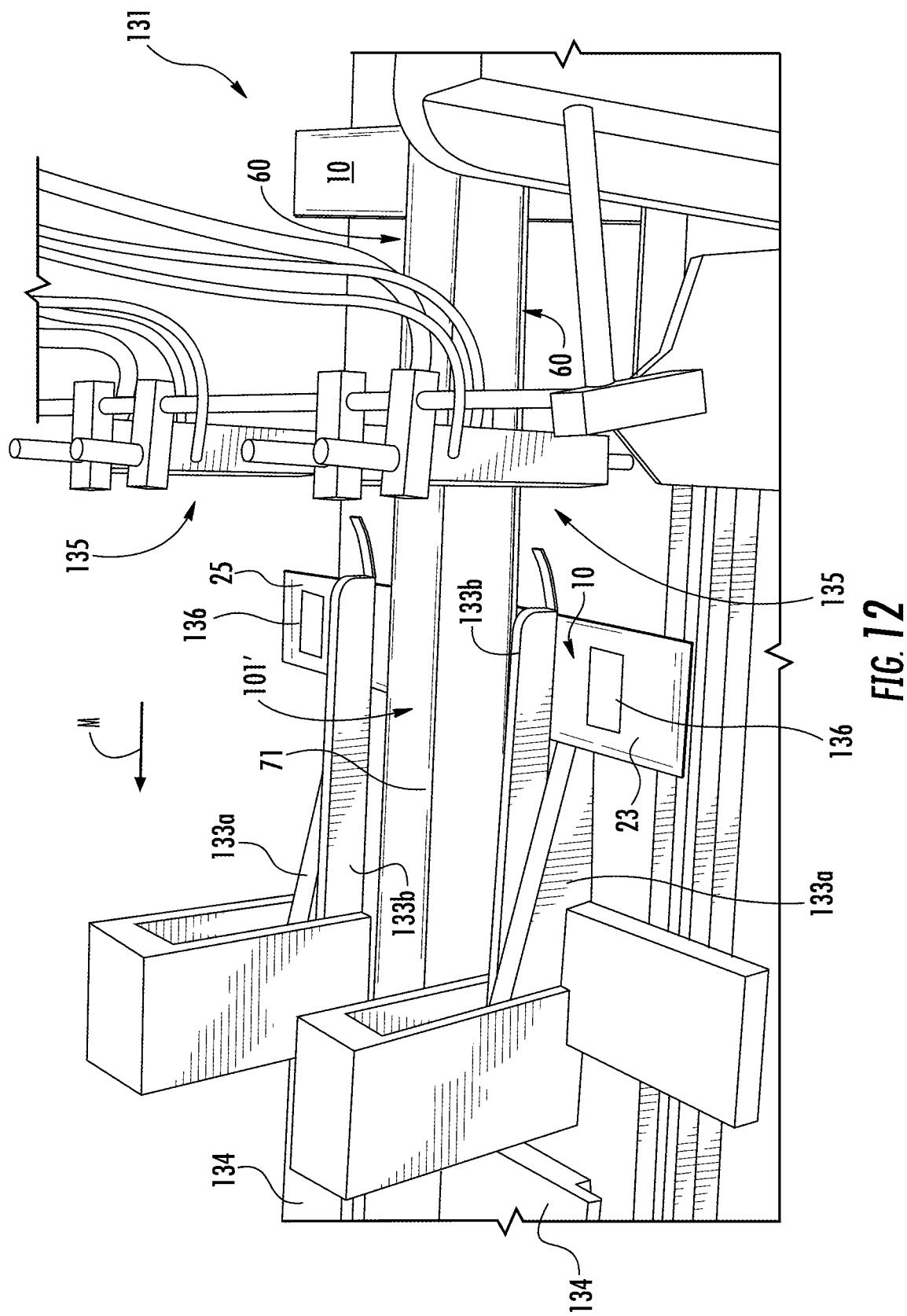
FIGS. 12 and 13 are perspective views of a carton forming assembly of the system of FIG. 5 schematically showing the carton forming assembly folding the blanks over the tube according to the exemplary embodiment of the disclosure.
Figure 13:
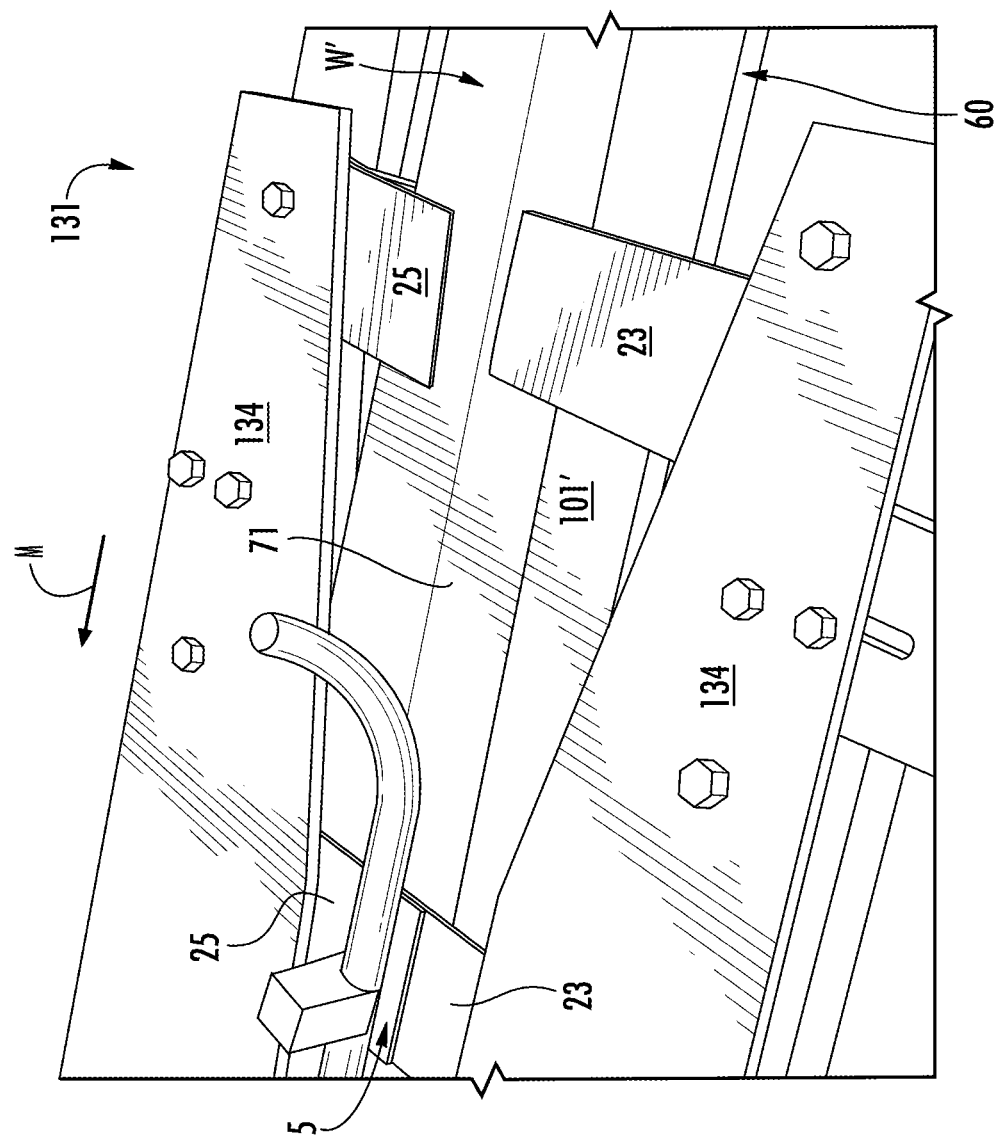
Figure 14:
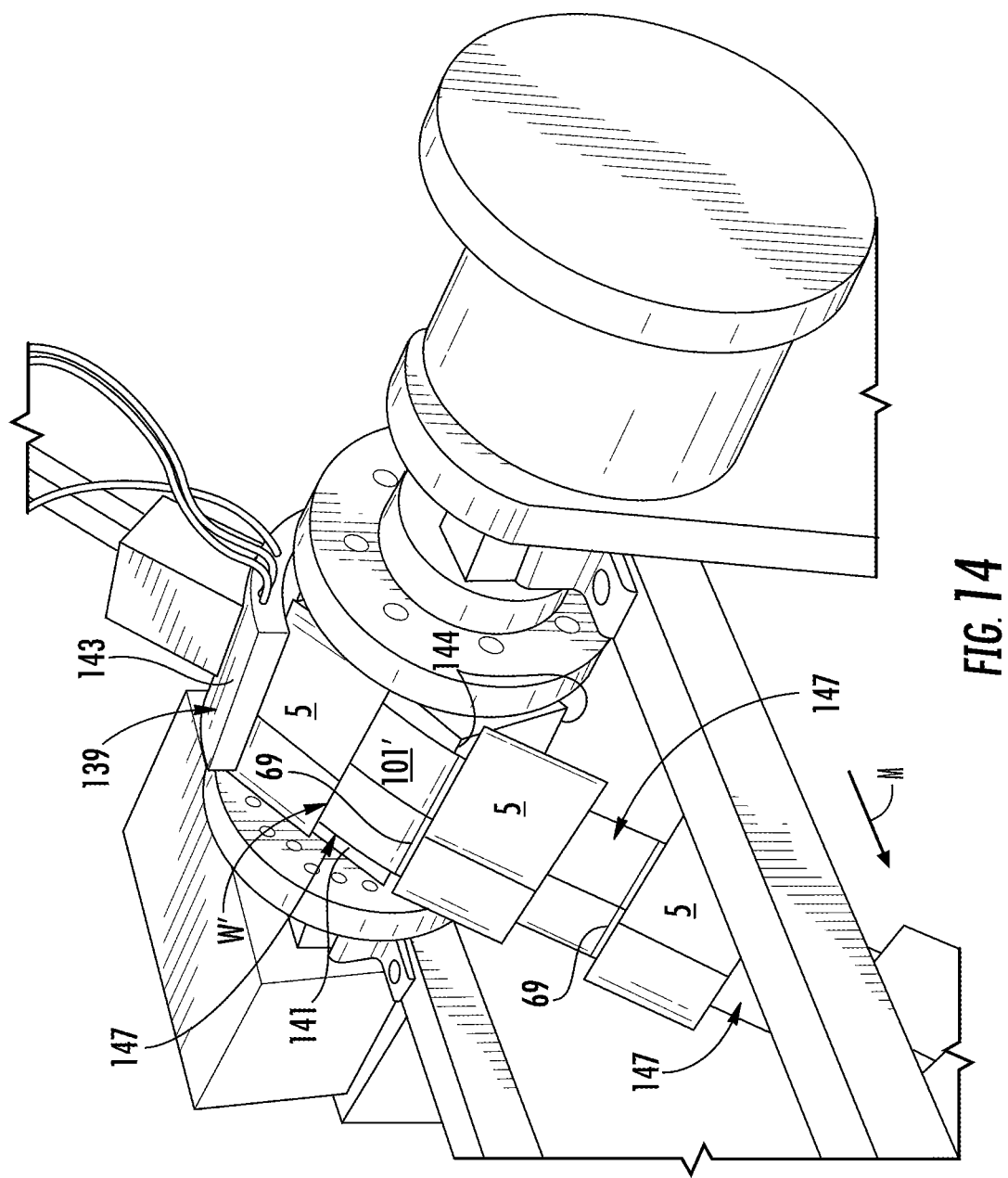
FIGS. 14 and 15 are perspective views of a heat sealer assembly of the system of FIG. 5 schematically showing the heat sealer assembly forming a transverse seal in the tube according to the exemplary embodiment of the disclosure.

In one embodiment, the attached web W' moves from the tube forming assembly 125 to a carton forming assembly 131 of the system 100. In one embodiment, the carton forming assembly 131 includes carton folding features (FIGS. 12 and 13) that position the various flaps and panels of the blank 10. In addition, the system 100 can include folders (not shown) for breaking the fold lines of the blank 10 (e.g., the arcuate fold lines 31, 33, 35, 37) between the tube forming assembly 125 and the carton forming assembly 131. In one embodiment, the carton forming assembly 131 includes a carton adhesive applicator 135 (FIG. 12) that applies adhesive (e.g., an adhesive 136 shown schematically in FIG. 12) to the blank 10 (e.g., at adhesive regions 41, 45—FIG. 2) so that panels (e.g., the first back panel 23 and the second back panel 25) can be overlapped and adhered (FIG. 13) to form the blank 10 into the reinforcement sleeve 5 as the attached web W' moves through the carton forming assembly 131. In the illustrated embodiment, the carton forming assembly 131 can include folding plates including outer wedge plates 133a, inner guide plates 133b, and forming plates 134. As shown in FIG. 12, the inner guide plates 133b can extend over the blank 10 (e.g., adjacent and inward of the lateral fold lines 26, 27—FIG. 2), and the outer wedge plates 133a can push the back panels 23, 25 of the blank upwardly to extend generally vertically between the respective outer wedge plates 133a and the respective inner guide plates 133b, folding the blank 10 at the lateral fold lines 26, 27 in one embodiment. As shown in FIG. 13, the forming plates 134 can have an inner edge that is angled inwardly to further fold the back panels 23, 25 downwardly over the tube 101'. Additionally, the forming plates 134 can press the back panels 23, 25 against the tube so that the adhesive 136 can attach the back panels to the tube. In one embodiment, the back panels 23, 25 can at least partially overlap and can be adhered to one another. The carton forming assembly 131 could be otherwise configured without departing from the disclosure. For example, the carton forming assembly 131 could use forming belts instead of or in addition to the folding plates shown in FIGS. 12 and 13.

As shown in FIGS. 5 and 14-16, the attached web W' moves from the carton forming assembly 131 through two drive rollers 135, 137 and into a rotary bag sealer assembly 139 that is downstream from the drive rollers. In one embodiment, the attached web W' moves upward from the drive rollers 135, 137 to the rotary bag sealer assembly 139 that includes a heat seal roller 141 and a heat seal arm 143. In one embodiment, the roller 141 has a square or other suitable polygonal cross-sectional shape (shown schematically in FIG. 16) so that the roller includes four edges 144 or corners around the circumference of the roller. Alternatively, the roller could have any suitable number of edges without departing from the disclosure. As the attached web W' moves upward from the rollers 135, 137, the roller 141 rotates and the edges 144 move into engagement with a respective section of the attached web corresponding to the bottom transverse seal 69 at the closed end 9 of the bag 3. The heat seal arm 143 is urged against the roller 141 and rides along the square shaped outer surface of the roller. As the corresponding edges 144 of the roller bring the corresponding section of the attached web W' into engagement with the heat seal arm 143, the arm moves away from the roller 141 but stays in contact with the roller to heat the web material and join the two layers of overlapped material at the section of the tube 101' to form the transverse seal 69. In one embodiment, the heat from the heat seal arm 143 can activate a previously-applied heat-activate glue and/or at least partially melt or weld the walls of the tube 101' together to form the transverse seal 69.

Figure 15:
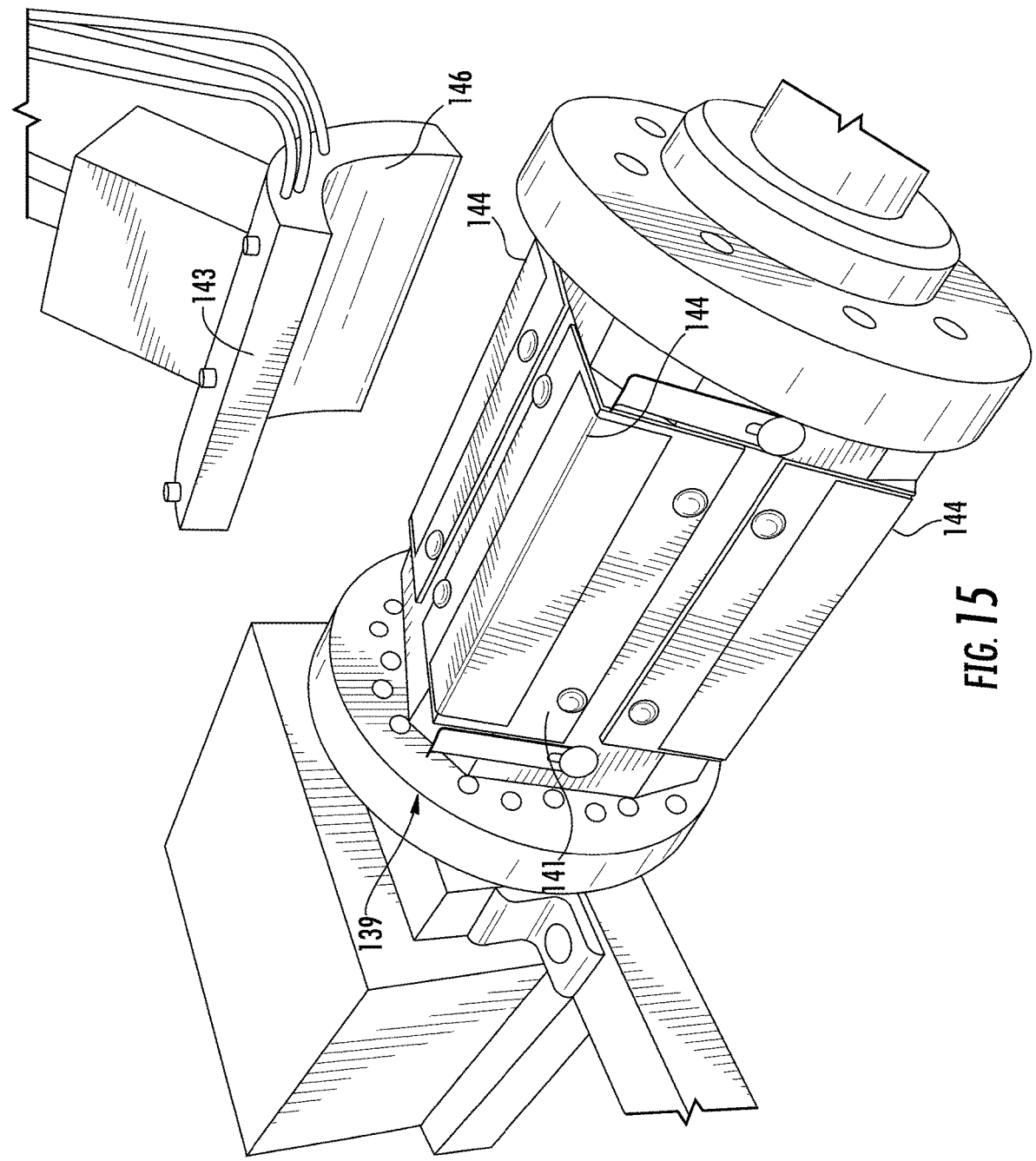
Figure 16:
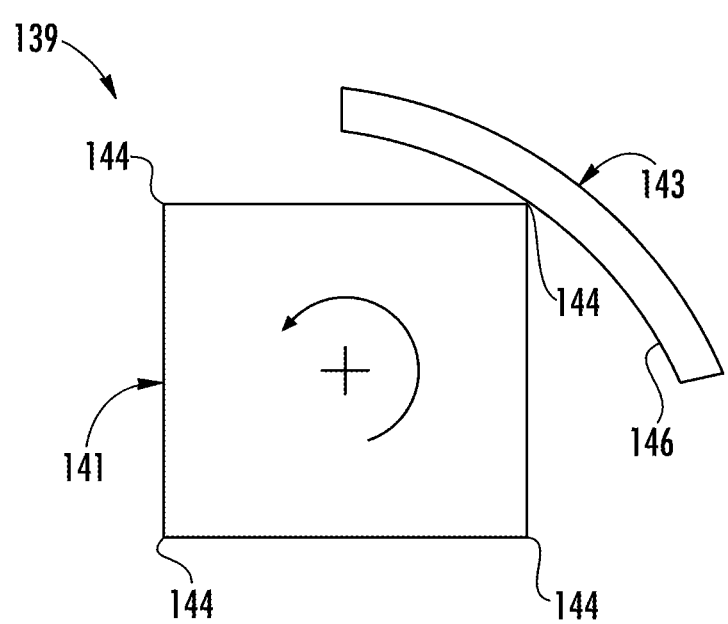
FIG. 16 is a schematic side view of the heat sealer assembly of FIGS. 14 and 15.

In the illustrated embodiment, the sequential transverse seals 69 disposed between each of the reinforcement sleeves 5 on the attached web W' moving downstream from the roller 141 can form tube portions 147 in the tube 101'. In one embodiment, the tube portions 147 can extend from one transverse seal 69 to another and can generally correspond to the bags 3 in the packages 1. The size of the roller 141 can be adjusted to change the distance between the respective edges to adjust to location of the bottom seal 9 of the bag 3 based on the size of the bag needed. As shown in FIGS. 15 and 16, the seal arm 143 is generally arcuate with a curved interior surface 146 that contacts the web of material 101 and presses the web of material against a respective edge 144. After leaving the rotary bag sealer assembly 139, the attached web W' includes a series of formed reinforced packages (e.g., including the reinforcement sleeves 5 attached to the tube portions 147, which generally correspond to the bags 3 in the separate packages 1) that are connected together via the tube 101'. The rotary bag sealer assembly 139 could be otherwise shaped, arranged, configured, and/or omitted without departing from the disclosure. For example, the sealer assembly 139 could include rollers with a generally cylindrical body having a series of raised heating elements arranged at spaced locations about the circumference of the roller so that the bottom transverse seals 69 of the bags 3 are provided by pressing the portion of the attached web W' against the raised heating elements.

Figure 17:
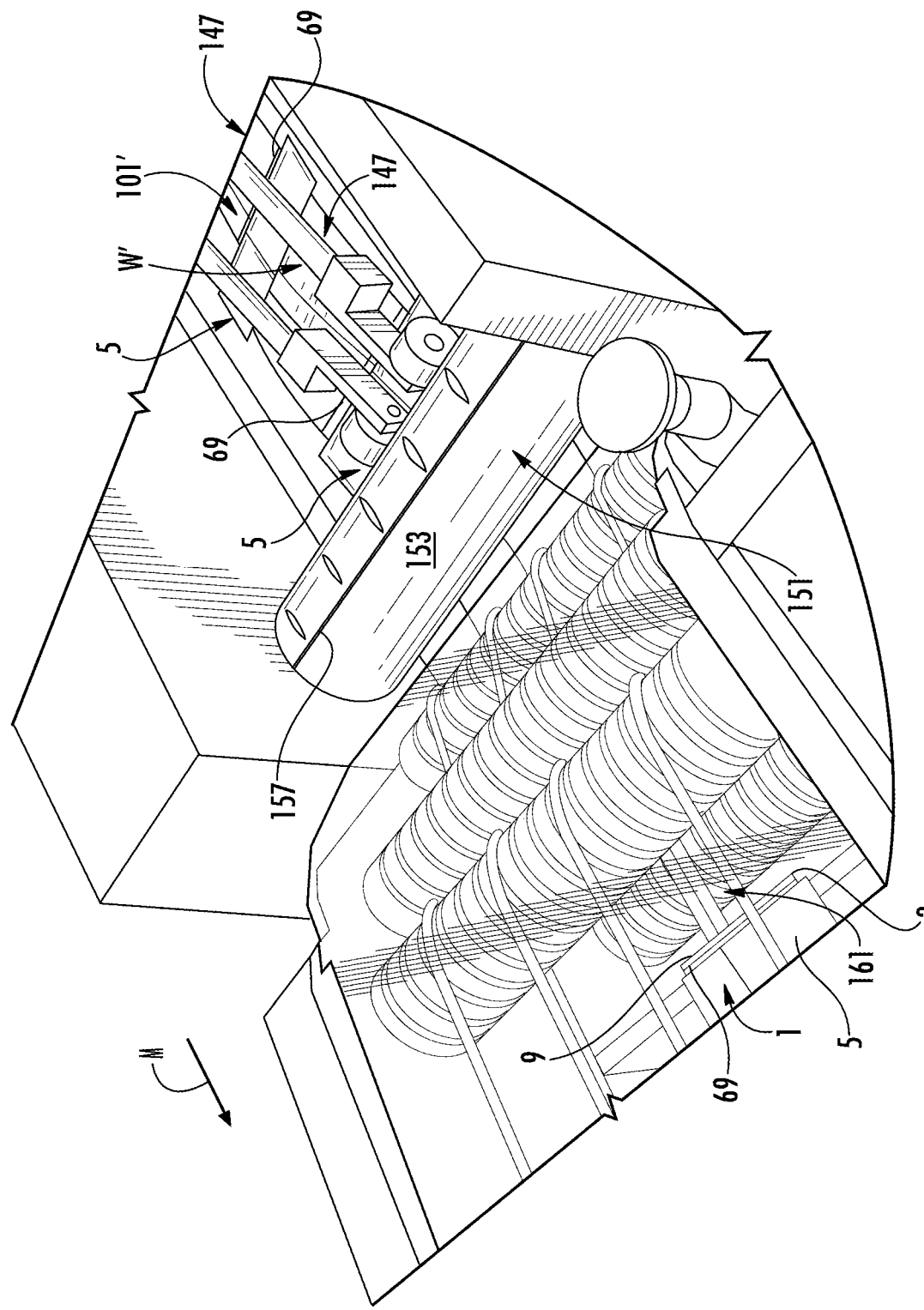
FIGS. 17 and 18 are perspective views of a cutter assembly and a conveyor assembly of the system of FIG. 5 schematically showing the cutting of the attached web into individual reinforced packages according to the exemplary embodiment of the disclosure.

As shown in FIGS. 5 and 17, the system 100 includes a cutting assembly 151 with one or more cutting features downstream from the rotary bag sealer assembly 139. In the illustrated embodiment, the cutting assembly is a rotary cutting assembly 151 that includes a cutting roller 153 and a base roller 155 that cut the attached web W' into the individual reinforced packages 1. The attached web W' is cut and separated into individual packages 1 by cutting the web material 101 at the location corresponding to the top edge 7 of the package 1 and the location corresponding to the bottom edge 9 of the package (e.g., adjacent the transverse seal 69). In one embodiment, the cutting roller 153 can have an edge 157 or other cutting feature that is configured to cut the tube 101' after the transverse seam 69 of a tube portion 147 passes the cutting roller 153 so that the cut is made just upstream from transverse seam 69. After the cut, the package 1 is now separated from the remainder of the attached web W' and the tube portion 147 is now the bag 3. The attached web W' can be cut and formed into the packages 1 by other mechanisms without departing from the disclosure. Further, the rotary cutting assembly 151 could be otherwise shaped, arranged, and/or configured without departing from the disclosure.

Figure 18:
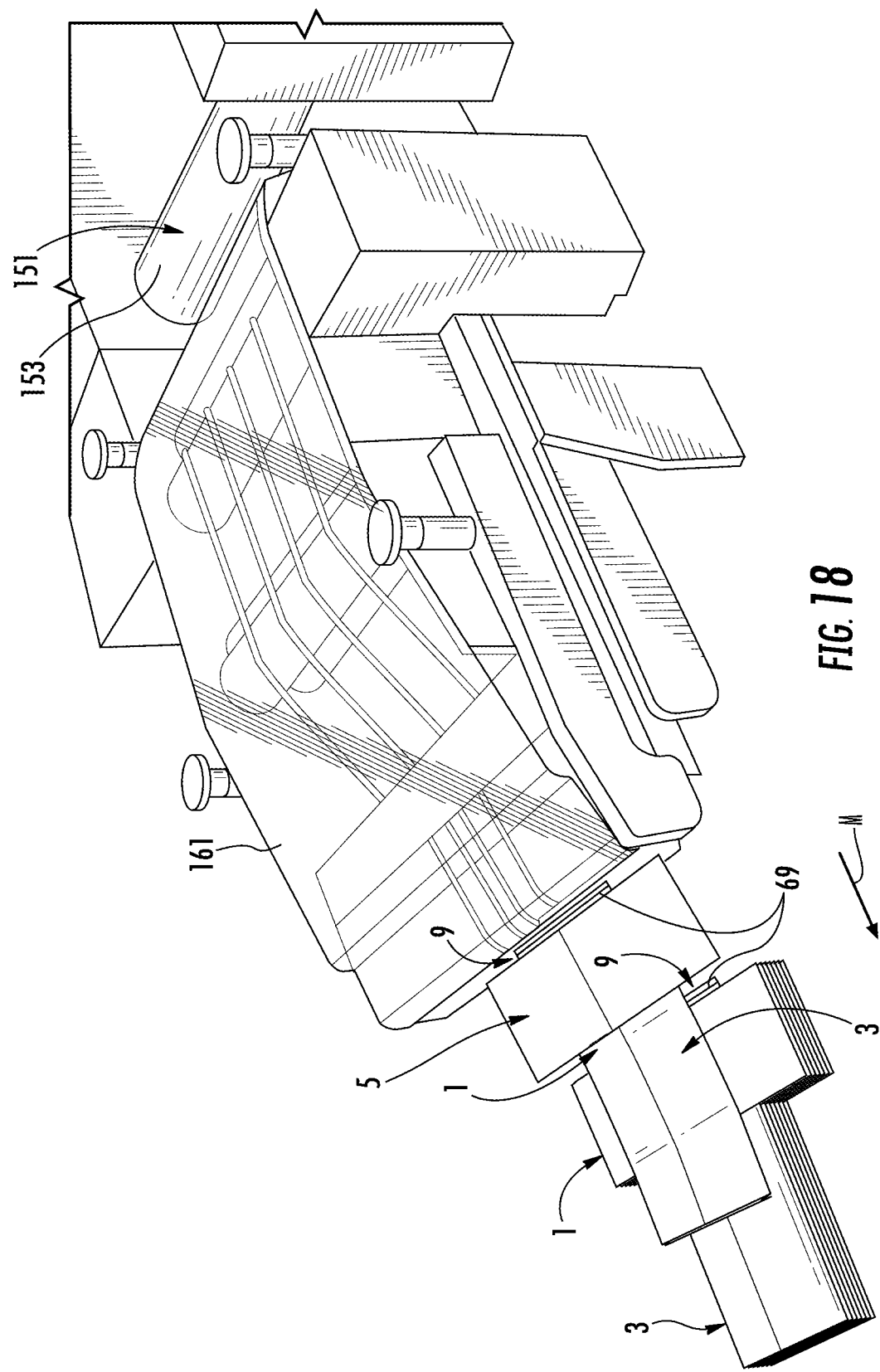

As shown in FIGS. 17, and 18, a conveyor assembly 161 is located downstream of the rotary bag sealer assembly 139 and the cutting assembly 151 to transport the separate packages 1 for collection and further handling and/or packaging for shipping to a customer. In one embodiment, the conveyor assembly 161 can include several belts driven by and guided by rollers to move the packages 1 away from the cutting assembly 151 and to output the packages onto a stack or another conveyor, for example. The packages 1 could be otherwise moved away from the cutting assembly 151 without departing from the disclosure.

Figure 19:
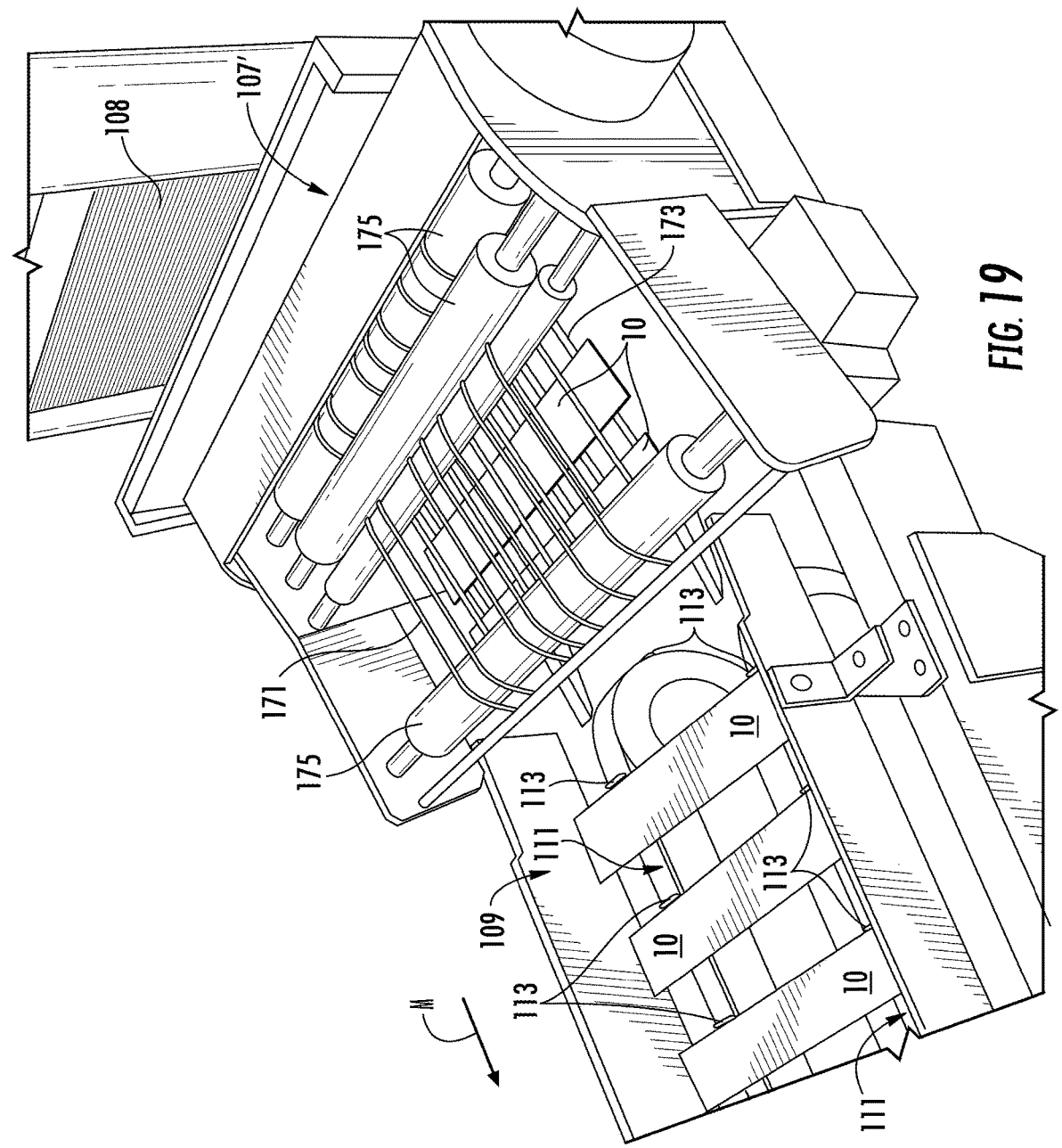
FIG. 19 is a perspective view of a carton feeder according to an alternative embodiment of the disclosure.

In an alternative embodiment, as shown in FIG. 19 the carton feeder 107 could be replaced by a belt driven carton feeder 107' that conveys a blank 10 from the stack at relatively higher speeds than the pick and place type carton feeder 107 of FIGS. 6A and 6B. In the illustrated embodiment, the carton feeder 107' can move the blanks 10 from the stack 108 between an upper series of belts 171 and a lower series of belts 173. The belts 171, 173 can be endless belts that extend around and are driven by a plurality of rollers 175, for example. The carton feeder 107' can be timed to output a blank 10 onto the lug belts 111 ahead of respective lugs 113, and a drag feature (e.g., the brushes 114 shown in FIGS. 7 and 8) can engage the blank 10 until the adjacent lugs 113 move downstream and engage an edge of the blank. As described above, the lugs 113 can then move the blank 10 downstream to the adhesive applicator 116. The blanks 10 could be otherwise fed to the blank conveyor 109 without departing from the disclosure. For example, the carton feeder could include a shuttle feeder or other suitable features.

Figure 20:
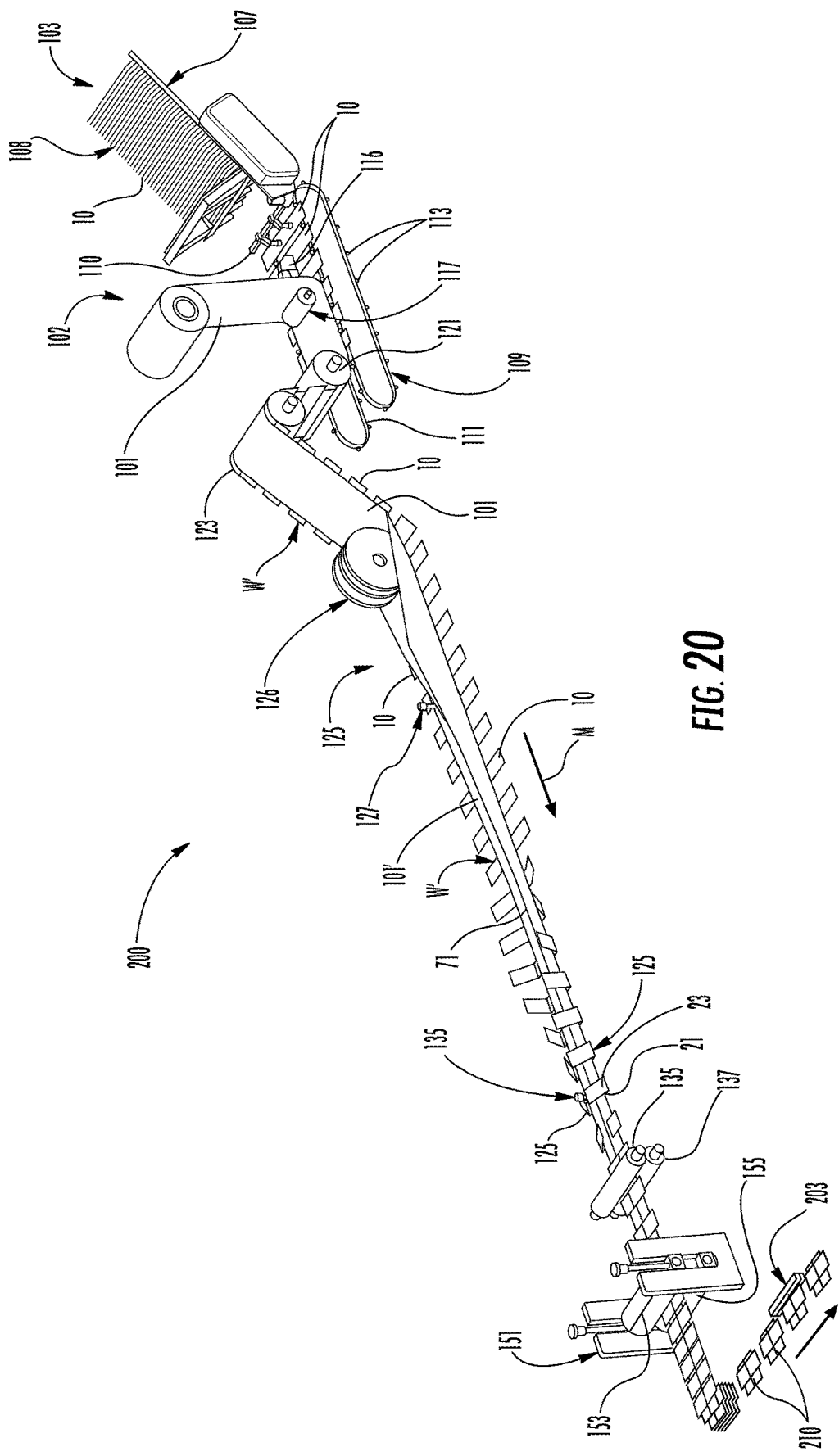
FIG. 20 is a schematic illustration of a system and method of forming the reinforced packages of FIG. 1 according to the a further alternative embodiment of the disclosure Corresponding parts are designated by corresponding reference numbers throughout the drawings.

FIG. 20 is a schematic view of a system 200 of a second embodiment that is similar to the system 100 of the first embodiment. The system 200 is for forming the reinforced packages 1 in a similar manner as the system 100 except system 200 includes a different sealing mechanism 203 for forming the transverse seals 69 the bottom ends 9 of the bags 3. Accordingly, like or similar references numbers are used to indicate like or similar features of the two embodiments. In the embodiment of FIG. 20, the rotary bag sealer assembly 139 (FIGS. 5 and 14-16) has been removed and replaced with the sealing mechanism 203 that heat seals the bottom end portions 9 of the bags 3 after the attached web W' has been separated at the rotary cutting assembly 151. Separated but unsealed packages 210, including reinforcement sleeves 5 attached to respective tube portions 147, can be fed to the sealing mechanism 203 and the bottom end portions 9 of the bags can be heat sealed to form the transverse seals 69 (FIG. 3) of the reinforced packages 1. The heat sealing mechanism 203 can be any suitable heat sealer machine for heat sealing the bag material 101, or any other suitable mechanism for forming the transverse seal 69 of the bag 3.

The system 100, 200 for forming the reinforced packages 1 of the present disclosure form the packages in a highly efficient manner by first attaching the web 101 to the blanks 10 to form the attached web W', and then forming the tube 101' from the web 101 including the side gussets 60 on each side of the tube. The blank 10 is then folded to form the reinforced construct or sleeve 5. The attached web W' including the tube 101' and the sleeves 5 is then further processed to form the bottom transverse seal 69 of the bags and to cut and separate the attached web into individual reinforced packages 1. The system 100, 200 of the present disclosure is more efficient than other systems that separately form the bags 3 and attach the formed bags to the blanks at least because once the blanks 10 are attached to the web 101 to create the attached web W' of the systems 100, 200 of the present disclosure, the blanks move with the web 101 in an aligned manner and twisting or turning of the blanks during processing is prevented by the secure attachment to the web. Furthermore, alignment of the separate blanks 10 and formed bags 3 is no longer needed as the packages 1 formed by the systems 100, 200 are formed from the attached web W' including the blanks 10 attached to the web 101.

Generally, as described herein, bags can be formed from a paper stock material, although various plastic or other bag materials also can be used, and can be lined or coated with a desired material. The reinforcing sleeves described herein can be made from a more rigid material such as a clay-coated natural kraft ("CCNK"). Other materials such various card-stock, paper, plastic or other synthetic or natural materials also can be used to form the components of the packages described herein.

In general, the blanks of the present disclosure may be constructed from paperboard having a caliper so that it is heavier and more rigid than ordinary paper. The blank can also be constructed of other materials, such as cardboard, or any other material having properties suitable for enabling the carton to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding there along. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of forming reinforced packages, the method comprising:
    forming an attached web by adhering a paperboard blank to a web of material;
    moving the attached web in a downstream direction through at least a tube forming assembly and a carton forming assembly, the carton forming assembly being downstream from the tube forming assembly, the moving the attached web comprising moving the paperboard blank with the web of material;
    at least partially forming a tube by folding at least a portion of the web of material as the attached web moves through the tube forming assembly;
    forming a reinforcement sleeve by folding at least a portion of the paperboard blank so that the reinforcement sleeve extends at least partially around the tube as the attached web moves through the carton forming assembly, the forming the reinforcement sleeve being after the at least partially forming the tube, the reinforcement sleeve comprising the paperboard blank; and
    forming a reinforced package comprising the reinforcement sleeve and a tube portion by separating the tube portion from a remainder of the tube, the reinforcement sleeve being adhered to the tube portion, the forming the reinforced package being after the forming the reinforcement sleeve.

2. The method of claim 1, further comprising forming a bag by at least partially forming a transverse seal in the tube portion.

3. The method of claim 2, wherein the method comprises forming the transverse seal in the tube before the separating the tube portion from the remainder of the tube.

4. The method of claim 3, wherein the forming the transverse seal comprises moving at least a portion of the tube of the attached web between a heat seal roller and a heat seal arm.

5. The method of claim 4, wherein the heat seal roller comprises at least one edge, the heat seal arm comprises a curved surface disposed proximate the heat seal roller, the forming the transverse seal in the tube comprises rotating the heat seal roller relative to the heat seal arm with a section of the tube extending along the edge, pressing at least a portion of the curved surface against at least a portion of the edge with the section of the tube disposed between the edge and the curved surface as the heat seal roller rotates, and applying heat to the section of the tube by heating at least one of the heat seal arm and the heat seal roller.

6. The method of claim 2, wherein the method comprises forming the transverse seal in the tube after the separating the tube portion from the remainder of the tube.

7. The method of claim 1, further comprising depositing the paperboard blank onto a conveyor before the forming the attached web, the conveyor comprising a plurality of lugs, at least one lug engaging the paperboard blank after the depositing the paperboard blank on the conveyor, the at least one lug moving the paperboard blank in the downstream direction.

8. The method of claim 7, wherein the conveyor comprises two spaced apart lug belts, each comprising lugs of the plurality of lugs.

9. The method of claim 7, wherein the adhering the paperboard blank to the web of material comprises moving the paperboard blank on the conveyor to an adhesive applicator, applying adhesive to at least a portion of the paperboard blank by operating the adhesive applicator, and moving the paperboard blank on the conveyor to an attachment assembly.

10. The method of claim 9, wherein the adhering the paperboard blank to the web of material further comprises bringing the web of material into contact with the paperboard blank so that the adhesive applied to the paperboard blank secures the paperboard blank to the web of material to form the attached web.

11. The method of claim 10, further comprising moving the attached web away from the conveyor over at least one roller to the tube forming assembly.

12. The method of claim 1, wherein the at least partially forming the tube comprises folding a first marginal portion of the web of material and a second marginal portion of the web of material to extend at least partially over a central portion of the web of material.

13. The method of claim 12, wherein the at least partially forming the tube further comprises forming a longitudinal seam by at least partially overlapping and adhering the first marginal portion and the second marginal portion of the web of material.

14. The method of claim 13, wherein the tube forming assembly comprises two guide rollers and an inner forming plate at least partially extending over the central portion of the web of material, and the at least partially overlapping and adhering the first marginal portion and the second marginal portion of the web of material comprises engaging the first marginal portion and the second marginal portion between the inner forming plate and the respective guide rollers of the two guide rollers so that the first marginal portion and the second marginal portion are moved from being generally planar with the central portion upstream from the two guide rollers to being at least partially overlapped and extending over the central portion downstream from the two guide rollers.

15. The method of claim 14, wherein the at least partially overlapping and adhering the first marginal portion and the second marginal portion of the web of material comprising applying a seam adhesive to at least one of the first marginal portion and the second marginal portion.

16. The method of claim 14, wherein the inner forming plate is spaced apart from the central portion of the web of material at an upstream end of the tube forming assembly so that the tube comprises a gusset portion extending from the central portion to each of the first marginal portion and the second marginal portion, and the at least partially forming the tube comprises moving the first marginal portion and the second marginal portion downwardly toward the central portion as the tube is moved in the downstream direction while pushing at least a portion of each of the gusset portions inwardly to form a gusset on respective sides of the tube.

17. The method of claim 14, wherein the tube forming assembly further comprises a forming wheel disposed upstream from the two guide rollers and the inner forming plate, the forming wheel at least partially engaging the central portion of the web of material during at least a portion of the folding the first marginal portion and the second marginal portion of the web of material.

18. The method of claim 1, wherein the paperboard blank comprises a front panel, a first back panel, and a second back panel, and the forming the reinforcement sleeve comprises folding the first back panel and the second back panel relative to the front panel to at least partially overlap the tube.

19. The method of claim 18, wherein the forming the reinforcement sleeve further comprises applying a carton adhesive to at least one of the first back panel and the second back panel by operating a carton adhesive applicator prior to the folding the first back panel and the second back panel so that at least one of the first back panel and the second back panel is adhered to the tube after the folding the first back panel and the second back panel.

20. The method of claim 18, wherein the folding the first back panel and the second back panel comprises at least partially overlapping and adhering the first back panel and the second back panel with one another.

* * * * *